(12) United States Patent
Takemura et al.

(10) Patent No.: US 9,058,746 B2
(45) Date of Patent: Jun. 16, 2015

(54) INFORMATION PROCESSING DEVICE ASSOCIATED WITH VEHICLE TRAVELING

(75) Inventors: Masayuki Takemura, Hitachi (JP); Shoji Muramatsu, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 387 days.

(21) Appl. No.: 13/122,369

(22) PCT Filed: Oct. 2, 2009

(86) PCT No.: PCT/JP2009/067215
§ 371 (c)(1),
(2), (4) Date: May 11, 2011

(87) PCT Pub. No.: WO2010/038851
PCT Pub. Date: Apr. 8, 2010

(65) Prior Publication Data
US 2011/0205042 A1   Aug. 25, 2011

(30) Foreign Application Priority Data
Oct. 2, 2008   (JP) .................................. 2008-256947

(51) Int. Cl.
*B60Q 1/00* (2006.01)
*G08G 1/16* (2006.01)
(Continued)

(52) U.S. Cl.
CPC ............... *G08G 1/166* (2013.01); *G01S 15/93* (2013.01); *G01S 17/93* (2013.01); *B60W 30/08* (2013.01)

(58) Field of Classification Search
None
See application file for complete search history.

(56) References Cited

U.S. PATENT DOCUMENTS

2002/0087255 A1* 7/2002 Jindo et al. ................... 701/96
2005/0033516 A1* 2/2005 Kawasaki ...................... 701/301
(Continued)

FOREIGN PATENT DOCUMENTS

JP   2000259430 A  *  9/2000
JP   2000-351337 A     12/2000
(Continued)

OTHER PUBLICATIONS

Corresponding International Search Report (Form PCT/ISA/210) dated Nov. 17, 2009 including Form PCT/ISA/237 (Six (6) pages).

*Primary Examiner* — Brian Zimmerman
*Assistant Examiner* — Kevin Lau
(74) *Attorney, Agent, or Firm* — Crowell & Moring LLP

(57) ABSTRACT

Provided are an information processing device and a processing method both of which are capable of executing processing in response to a traveling situation of a vehicle, thereby securing safety at the time of emergency while securing convenience. The aforementioned information processing device includes: an image obtaining section which performs imaging and obtains information associated with an image; an information obtaining section which obtains the information of a traveling state; a first executing section which executes a first application that executes information processing for improving the safety of traveling; a second executing application which executes a second application that executes the information processing associated with an improvement in traveling feeling; and a determining section which, based on the information obtained in the image obtaining section and the information obtained in the information obtaining section, determines with or without a possibility of encountering an emergency event. Based on determination, made by the determining section, that it is likely to encounter the emergency event, the information processing device stops part of or the overall processing executed by the second executing section.

11 Claims, 37 Drawing Sheets

Task table
General-road mode (at normal time)

| Application (function) name | Effective flag | Priority order | Processing [fps] | Resolution [Lateral, Longitudinal] | Detection distance |
|---|---|---|---|---|---|
| Lane recognition (essential version) Application 1130 | ON | 7 | 1/1 | [1/3,1/2] | 30 |
| Pedestrian detection (essential version) Application 1140 | ON | 5 | 1/1 | [1/3,1/2] | 40 |
| Vehicle detection (essential version) Application 1150 | ON | 6 | 1/1 | [1/3,1/2] | 40 |
| Lane recognition (additional version) Application 2130 | ON | 13 | 1/1 | [1,1] | 60 |
| Pedestrian detection (additional version) Application 2140 | ON | 11 | 1/1 | [1,1] | 80 |
| Vehicle detection (additional version) Application 2150 | ON | 12 | 1/1 | [1,1] | 80 |
| Automatic lighting    Application 160 | ON | 25 | 1/5 | [1/3,1/2] | 15 |
| Mark detection    Application 170 | ON | 31 | 1/3 | [1/3,1/2] | 25 |
| Road-surface mark detection Application 180 | ON | 32 | 1/3 | [1/3,1/2] | 15 |

(51) Int. Cl.
  *G01S 15/93* (2006.01)
  *G01S 17/93* (2006.01)
  *B60W 30/08* (2012.01)

(56) References Cited

U.S. PATENT DOCUMENTS

2007/0140527 A1* 6/2007 Yamamoto et al. ............ 382/104
2008/0025597 A1* 1/2008 Muramatsu et al. .......... 382/156

FOREIGN PATENT DOCUMENTS

| JP | 2000351337 A | * | 12/2000 |
| JP | 2004210148 A | * | 7/2004 |
| JP | 2006-281900 A | | 10/2006 |
| JP | 2006-330979 A | | 12/2006 |
| JP | 2006330979 A | * | 12/2006 |
| JP | 2006347352 A | * | 12/2006 |
| JP | 2008-152386 A | | 7/2008 |

* cited by examiner

FIG. 3

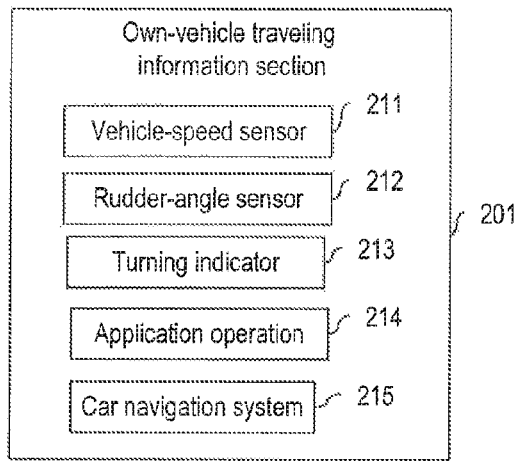

FIG. 4

Task table

General-road mode (at normal time)

| Application (function) name | Effective flag | Priority order | Processing [fps] | Resolution [Lateral, Longitudinal] | Detection distance |
|---|---|---|---|---|---|
| Lane recognition (essential version) Application 1130 | ON | 7 | 1/1 | [1/3,1/2] | 30 |
| Pedestrian detection (essential version) Application 1140 | ON | 5 | 1/1 | [1/3,1/2] | 40 |
| Vehicle detection (essential version) Application 1150 | ON | 6 | 1/1 | [1/3,1/2] | 40 |
| Lane recognition (additional version) Application 2130 | ON | 13 | 1/1 | [1,1] | 60 |
| Pedestrian detection (additional version) Application 2140 | ON | 11 | 1/1 | [1,1] | 80 |
| Vehicle detection (additional version) Application 2150 | ON | 12 | 1/1 | [1,1] | 80 |
| Automatic lighting       Application 160 | ON | 25 | 1/5 | [1/3,1/2] | 15 |
| Mark detection            Application 170 | ON | 31 | 1/3 | [1/3,1/2] | 25 |
| Road-surface mark detection Application 180 | ON | 32 | 1/3 | [1/3,1/2] | 15 |

FIG. 5

High-speed mode (at normal time)   Task table

| Application (function) name | Effective flag | Priority order | Processing [fps] | Resolution [Lateral, Longitudinal] | Detection distance |
|---|---|---|---|---|---|
| Lane recognition (essential version) Application 1130 | ON | 7 | 1/1 | [1/3, 1/2] | 40 |
| Pedestrian detection (essential version) Application 1140 | OFF | - | - | - | - |
| Vehicle detection (essential version) Application 1150 | ON | 6 | 1/1 | [1/3, 1/2] | 50 |
| Lane recognition (additional version) Application 2130 | ON | 13 | 1/1 | [1, 1] | 80 |
| Pedestrian detection (additional version) Application 2140 | OFF | - | - | - | - |
| Vehicle detection (additional version) Application 2150 | ON | 12 | 1/1 | [1, 1] | 100 |
| Automatic lighting    Application 160 | ON | 25 | 1/3 | [1/3, 1/2] | 15 |
| Mark detection    Application 170 | ON | 31 | 1/3 | [1/3, 1/2] | 30 |
| Road-surface mark detection    Application 180 | OFF | - | - | - | - |

FIG. 6

Task table
General-road mode (At time of emergency control of pedestrian collision prevention,
at time of emergency control of leading-vehicle collision avoidance)

| Application (function) name | Effective flag | Priority order | Processing [fps] | Resolution [Lateral, Longitudinal] | Detection distance |
|---|---|---|---|---|---|
| Lane recognition (essential version) Application 1130 | ON | 7 | 1/1 | [1/3, 1/2] | 30 |
| Pedestrian detection (essential version) Application 1140 | ON | 5 | 1/1 | [1/3, 1/2] | 40 |
| Vehicle detection (essential version) Application 1150 | ON | 6 | 1/1 | [1/3, 1/2] | 40 |
| Lane recognition (additional version) Application 2130 | OFF | - | - | - | - |
| Pedestrian detection (additional version) Application 2140 | OFF | - | - | - | - |
| Vehicle detection (additional version) Application 2150 | OFF | - | - | - | - |
| Automatic lighting    Application 160 | ON | 25 | 1/5 | [1/3, 1/2] | 15 |
| Mark detection    Application 170 | OFF | - | - | - | - |
| Road-surface mark detection    Application 180 | OFF | - | - | - | - |

FIG. 7

High-speed mode (at the time of lane,
traffic-lane departure control)    Task table

| Application (function) name | Effective flag | Priority order | Processing [fps] | Resolution [Lateral, Longitudinal] | Detection distance |
|---|---|---|---|---|---|
| Lane recognition (essential version) Application 1130 | ON | 7 | 1/1 | [1/3,1/2] | 40 |
| Pedestrian detection (essential version) Application 1140 | OFF | - | - | - | - |
| Vehicle detection (essential version) Application 1150 | ON | 6 | 1/1 | [1/3,1/2] | 50 |
| Lane recognition (additional version) Application 2130 | ON | 11 | 1/1 | [1,1] | 80 |
| Pedestrian detection (additional version) Application 2140 | OFF | - | - | - | - |
| Vehicle detection (additional version) Application 2150 | ON | 12 | 1/2 | [1,1] | 80 |
| Automatic lighting    Application 160 | ON | 25 | 1/5 | [1/3,1/2] | 15 |
| Mark detection    Application 170 | ON | 31 | 1/5 | [1/3,1/2] | 30 |
| Road-surface mark detection    Application 180 | OFF | - | - | - | - |

FIG. 8

General-road mode (at the time of inter-vehicle distance
control, leading-vehicle 30 m)    Task table

| Application (function) name | Effective flag | Priority order | Processing [fps] | Resolution [Lateral, Longitudinal] | Detection distance |
|---|---|---|---|---|---|
| Lane recognition (essential version) Application 1130 | ON | 7 | 1/1 | [1/3,1/2] | 30 |
| Pedestrian detection (essential version) Application 1140 | ON | 5 | 1/1 | [1/3,1/2] | 40 |
| Vehicle detection (essential version) Application 1150 | ON | 6 | 1/1 | [1/3,1/2] | 40 |
| Lane recognition (additional version) Application 2130 | ON | 13 | 1/2 | [1,1] | 40 |
| Pedestrian detection (additional version) Application 2140 | OFF | - | - | - | - |
| Vehicle detection (additional version) Application 2150 | OFF | - | - | - | - |
| Automatic lighting    Application 160 | ON | 25 | 1/5 | [1/3,1/2] | 15 |
| Mark detection    Application 170 | ON | 31 | 1/5 | [1/3,1/2] | 25 |
| Road-surface mark detection Application 180 | ON | 32 | 1/5 | [1/3,1/2] | 15 |

If in current situation, dangerousness of collision; predict control start timing Predict collision prediction time and control start timing based on relative speed, relative distance If in current situation, traffic-lane departure; predict control start timing

FIG. 21

Control/Alarm table

| Application (function) name | Emergency control | Control | Alarm |
|---|---|---|---|
| Lane recognition (essential version) Application 1130 | Traffic-lane departure | Lane keep | |
| Pedestrian detection (essential version) Application 1140 | Emergency stop | | |
| Vehicle detection (essential version) Application 1150 | Emergency stop | Deceleration, Acceleration suppression control | |
| Lane recognition (additional version) Application 2130 | | Curve deceleration, Acceleration suppression control | |
| Pedestrian detection (additional version) Application 2140 | | Deceleration, Acceleration suppression control | |
| Vehicle detection (additional version) Application 2150 | | Inter-vehicle control | |
| Automatic lighting    Application 160 | | | |
| Mark detection    Application 170 | | | Vehicle-speed suppression |
| Road-surface mark detection Application 180 | | | Vehicle-speed suppression |

FIG. 27

Mode before starting vehicle

| Application (function) name | Effective flag | Priority order | Processing [fps] | Resolution [Lateral, Longitudinal] | Detection distance |
|---|---|---|---|---|---|
| Lane recognition (essential version) | OFF | - | - | - | - |
| Pedestrian detection (essential version) | OFF | - | - | - | - |
| Vehicle detection (essential version) | OFF | - | - | - | - |
| Lane recognition (additional version) | OFF | - | - | - | - |
| Pedestrian detection (additional version) | OFF | - | - | - | - |
| Vehicle detection (additional version) | OFF | - | - | - | - |
| Automatic lighting | OFF | - | - | - | - |
| Mark detection | OFF | - | - | - | - |
| Road-surface mark detection | OFF | - | - | - | - |
| Doze, looking-aside detection | OFF | - | - | - | - |
| Fog, snow detection | OFF | - | - | - | - |
| Rain-drop, window-fogging detection | ON | 20 | 1/5 | [1/3, 1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | ON | 5 | 1/1 | [1/3, 1/2] | 3 |
| Movable body detection (additional version) | ON | 15 | 1/2 | [1/3, 1/2] | 10 |
| Indoor abnormal-behavior detection | ON | 9 | 1/1 | [1/3, 1/2] | - |
| Road-surface state detection | OFF | - | - | - | - |

FIG. 28

Low-speed mode immediately after starting vehicle (at normal time)

| Application (function) name | Effective flag | Priority order | Processing [fps] | Resolution [Lateral, Longitudinal] | Detection distance |
|---|---|---|---|---|---|
| Lane recognition (essential version) | OFF | - | - | - | - |
| Pedestrian detection (essential version) | OFF | - | - | - | - |
| Vehicle detection (essential version) | OFF | - | - | - | - |
| Lane recognition (additional version) | OFF | - | - | - | - |
| Pedestrian detection (additional version) | OFF | - | - | - | - |
| Vehicle detection (additional version) | OFF | - | - | - | - |
| Automatic lighting | OFF | - | - | - | - |
| Mark detection | OFF | - | - | - | - |
| Road-surface mark detection | OFF | - | - | - | - |
| Doze, looking-aside detection | OFF | - | - | - | - |
| Fog, snow detection | ON | 40 | 1/50 | [1/3,1/2] | - |
| Rain-drop, window-fogging detection | ON | 41 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | ON | 5 | 1/1 | [1/3,1/2] | 5 |
| Movable body detection (additional version) | ON | 10 | 1/1 | [1/3,1/2] | 10 |
| Indoor abnormal-behavior detection | OFF | - | - | - | - |
| Road-surface state detection | ON | 42 | 1/50 | [1/3,1/2] | - |

FIG. 29

Low-speed mode immediately after starting vehicle (at time of emergency)

| Application (function) name | Effective flag | Priority order | Processing [fps] | Resolution [Lateral, Longitudinal] | Detection distance |
|---|---|---|---|---|---|
| Lane recognition (essential version) | OFF | - | - | - | - |
| Pedestrian detection (essential version) | OFF | - | - | - | - |
| Vehicle detection (essential version) | OFF | - | - | - | - |
| Lane recognition (additional version) | OFF | - | - | - | - |
| Pedestrian detection (additional version) | OFF | - | - | - | - |
| Vehicle detection (additional version) | OFF | - | - | - | - |
| Automatic lighting | OFF | - | - | - | - |
| Mark detection | OFF | - | - | - | - |
| Road-surface mark detection | OFF | - | - | - | - |
| Doze, looking-aside detection | OFF | - | - | - | - |
| Fog, snow detection | OFF | - | - | - | - |
| Rain-drop, window-fogging detection | OFF | - | - | - | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | ON | 5 | 1/1 | [1/3, 1/2] | 5 |
| Movable body detection (additional version) | OFF | - | - | - | - |
| Indoor abnormal-behavior detection | OFF | - | - | - | - |
| Road-surface state detection | OFF | - | - | - | - |

FIG. 30

Eco-automatic mode (at normal time)

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | ON | 13 | 1/1 | [1,1] | 60 |
| Pedestrian detection (additional version) | ON | 11 | 1/1 | [1,1] | 80 |
| Vehicle detection (additional version) | ON | 12 | 1/1 | [1,1] | 80 |
| Automatic lighting | ON | 25 | 1/5 | [1/3,1/2] | 15 |
| Mark detection | ON | 31 | 1/3 | [1/3,1/2] | 25 |
| Road-surface mark detection | ON | 32 | 1/3 | [1/3,1/2] | 15 |
| Doze, looking-aside detection | ON | 40 | 1/50 | [1/3,1/2] | - |
| Fog, snow detection | ON | 41 | 1/50 | [1/3,1/2] | - |
| Rain-drop, window-fogging detection | ON | 42 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | ON | 43 | 1/50 | [1/3,1/2] | - |

FIG. 31

Eco-automatic mode (at normal time)

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | OFF | - | - | - | - |
| Pedestrian detection (additional version) | OFF | - | - | - | - |
| Vehicle detection (additional version) | OFF | - | - | - | - |
| Automatic lighting | ON | 25 | 1/5 | [1/3,1/2] | 15 |
| Mark detection | ON | 31 | 1/3 | [1/3,1/2] | 25 |
| Road-surface mark detection | ON | 32 | 1/3 | [1/3,1/2] | 15 |
| Doze, looking-aside detection | ON | 40 | 1/50 | [1/3,1/2] | - |
| Fog, snow detection | ON | 41 | 1/50 | [1/3,1/2] | - |
| Rain-drop, window-fogging detection | ON | 42 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | ON | 43 | 1/50 | [1/3,1/2] | - |

FIG. 32

Sport automatic mode (at normal time)

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | OFF | - | - | - | - |
| Pedestrian detection (additional version) | ON | 11 | 1/1 | [1,1] | 80 |
| Vehicle detection (additional version) | ON | 12 | 1/1 | [1,1] | 80 |
| Automatic lighting | ON | 25 | 1/5 | [1/3,1/2] | 15 |
| Mark detection | ON | 31 | 1/3 | [1/3,1/2] | 25 |
| Road-surface mark detection | OFF | - | - | - | - |
| Doze, looking-aside detection | OFF | - | - | - | - |
| Fog, snow detection | ON | 41 | 1/50 | [1/3,1/2] | - |
| Rain-drop, window-fogging detection | ON | 42 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | ON | 43 | 1/50 | [1/3,1/2] | - |

FIG. 33

Urban-area dedicated mode

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | OFF | - | - | - | - |
| Pedestrian detection (additional version) | OFF | - | - | - | - |
| Vehicle detection (additional version) | OFF | - | - | - | - |
| Automatic lighting | ON | 25 | 1/5 | [1/3,1/2] | 15 |
| Mark detection | ON | 31 | 1/3 | [1/3,1/2] | 25 |
| Road-surface mark detection | ON | 32 | 1/3 | [1/3,1/2] | 15 |
| Doze, looking-aside detection | ON | 40 | 1/50 | [1/3,1/2] | - |
| Fog, snow detection | ON | 41 | 1/50 | [1/3,1/2] | - |
| Rain-drop, window-fogging detection | ON | 42 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | ON | 43 | 1/50 | [1/3,1/2] | - |

FIG. 34

Compact car for town traveling

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | OFF | - | - | - | - |
| Pedestrian detection (additional version) | OFF | - | - | - | - |
| Vehicle detection (additional version) | OFF | - | - | - | - |
| Automatic lighting | ON | 25 | 1/5 | [1/3,1/2] | 15 |
| Mark detection | OFF | - | - | - | - |
| Road-surface mark detection | OFF | - | - | - | - |
| Doze, looking-aside detection | ON | 40 | 1/50 | [1/3,1/2] | - |
| Fog, snow detection | OFF | - | - | - | - |
| Rain-drop, window-fogging detection | OFF | - | - | - | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | OFF | - | - | - | - |

FIG. 35

Standard-size car for Japan

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | OFF | - | - | - | - |
| Pedestrian detection (additional version) | ON | 11 | 1/1 | [1,1] | 60 |
| Vehicle detection (additional version) | ON | 12 | 1/1 | [1,1] | 60 |
| Automatic lighting | ON | 25 | 1/5 | [1/3,1/2] | 15 |
| Mark detection | ON | 31 | 1/3 | [1/3,1/2] | 25 |
| Road-surface mark detection | ON | 32 | 1/3 | [1/3,1/2] | 15 |
| Doze, looking-aside detection | ON | 40 | 1/50 | [1/3,1/2] | - |
| Fog, snow detection | ON | 41 | 1/50 | [1/3,1/2] | - |
| Rain-drop, window-fogging detection | ON | 42 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | OFF | - | - | - | - |

FIG. 36

Standard-size car for North America

| Application (function) name | Effective flag | Priority order | Processing [fps] | Resolution [Lateral, Longitudinal] | Detection distance |
|---|---|---|---|---|---|
| Lane recognition (essential version) | ON | 7 | 1/1 | [1/3,1/2] | 30 |
| Pedestrian detection (essential version) | ON | 5 | 1/1 | [1/3,1/2] | 40 |
| Vehicle detection (essential version) | ON | 6 | 1/1 | [1/3,1/2] | 40 |
| Lane recognition (additional version) | ON | 10 | 1/1 | [1,1] | 80 |
| Pedestrian detection (additional version) | OFF | - | - | - | - |
| Vehicle detection (additional version) | ON | 12 | 1/1 | [1,1] | 80 |
| Automatic lighting | ON | 25 | 1/5 | [1/3,1/2] | 15 |
| Mark detection | OFF | - | - | - | - |
| Road-surface mark detection | OFF | - | - | - | - |
| Doze, looking-aside detection | ON | 40 | 1/50 | [1/3,1/2] | - |
| Fog, snow detection | OFF | - | - | - | - |
| Rain-drop, window-fogging detection | ON | 42 | 1/50 | [1/3,1/2] | - |
| Drive recorder | OFF | - | - | - | - |
| Parking frame detection (essential version) | OFF | - | - | - | - |
| Parking frame detection (additional version) | OFF | - | - | - | - |
| Movable body detection (essential version) | OFF | - | - | - | - |
| Movable body detection (additional version) | OFF | - | - | - | - |
| Indoor abnormal-behavior detection | OFF | - | - | - | - |
| Road-surface state detection | OFF | - | - | - | - |

FIG. 37

Task table in case of real-time application scheduling correction

| Application (function) name | Effective flag | Priority order | Processing [fps] | Resolution [Lateral, Longitudinal] | Detection distance | Execution status |
|---|---|---|---|---|---|---|
| Lane recognition (essential version) Application 1130 | ON | 7 | 1/1 | [1/3,1/2] | 30 | During execution |
| Pedestrian detection (essential version) Application 1140 | ON | 5 | 1/1 | [1/3,1/2] | 40 | Terminated |
| Vehicle detection (essential version) Application 1150 | ON | 6 | 1/1 | [1/3,1/2] | 40 | Terminated |
| Lane recognition (additional version) Application 2130 | OFF | - | - | - | - | |
| Pedestrian detection (additional version) Application 2140 | ON | 11 | 1/1 | [1,1] | 80 | Waiting |
| Vehicle detection (additional version) Application 2150 | ON | 12 | 1/1 | [1,1] | 80 | Waiting |
| Automatic lighting         Application 160 | ON | 25 | 1/5 | [1/3,1/2] | 15 | Waiting |
| Mark detection           Application 170 | ON | 31 | 1/3 | [1/3,1/2] | 25 | Waiting |
| Road-surface mark detection Application 180 | OFF | - | - | - | - | |
| Doze, looking-aside detection | OFF | - | - | - | - | |
| Fog, snow detection | ON | 41 | 1/50 | [1/3,1/2] | - | Waiting |
| Rain-drop, window-fogging detection | ON | 42 | 1/50 | [1/3,1/2] | - | Waiting |
| Drive recorder | OFF | - | - | - | - | |
| Parking frame detection (essential version) | OFF | - | - | - | - | |
| Parking frame detection (additional version) | OFF | - | - | - | - | |
| Movable body detection (essential version) | OFF | - | - | - | - | |
| Movable body detection (additional version) | OFF | - | - | - | - | |
| Indoor abnormal-behavior detection | OFF | - | - | - | - | |
| Road-surface state detection | ON | 43 | 1/50 | [1/3,1/2] | - | |

INFORMATION PROCESSING DEVICE ASSOCIATED WITH VEHICLE TRAVELING

TECHNICAL FIELD

The present invention relates to a device for processing information and a method for processing the same, the information being for use in vehicle traveling.

BACKGROUND ART

It is important to adequately process information for use in vehicle traveling for improving safety of traveling. There is a need for increasing the safety of vehicle traveling. Thus, a processing amount for use tends to be increased. As for various processing associated with safe traveling of a vehicle, it is not necessary to execute all of the processing at all times. In addition, if all of the processing are attempted to be executed at all times, loads on a processing device would be extremely high, thereby giving rise to such problems as not being able to execute such processing because of a corresponding speed and the like. Therefore, there has been a way of thinking that processing is executed after priority has been placed on a processing content.

Here, as to processing of a plurality of applications for the vehicle traveling which uses information of a content detected by an on-vehicle camera, a sensor, a radar, or the like, a technology for executing such processing after having placed priority is disclosed in JP Patent Publication (Kokai) No. 2006-281900 A (see Patent Document 1).

Patent Document 1: JP Patent Publication (Kokai) No. 2006-281900 A

DISCLOSURE OF THE INVENTION

Problems to be Solved by the Invention

As for traveling control of a vehicle, there is a great need for improving safety; detailed processing is required; and it is desirable to secure time for the respective processing. With respect to a plurality of applications concerning the traveling control, the need cannot be sufficiently satisfied only by having placed given priority and executing the processing. In order to meet the above-mentioned need, it is desirable to determine necessity of the processing or the priority of the processing, in response to traveling situations of the vehicle.

An object of the present invention is to provide a device for processing information and a method for processing the same, both being capable of executing the processing in response to the traveling situations of the vehicle.

Means for Solving the Problems

One invention has been configured to, based on traveling situations, change processing, a target for the processing to be executed, with or without necessity for the processing, or processing conditions such as a processing cycle.

Another invention has been configured to detect an emergent situation from the standpoint of safe traveling; based on the above-mentioned detection, change priority of processing at the time of emergency; and preferentially execute emergent processing.

A further invention has been configured to separate a setting program for setting the processing conditions which change the processing conditions such as with or without necessity for processing, priority of the processing, a processing cycle, or the like from a traveling processing program to be executed based on the above-mentioned set conditions.

Effects of the Invention

According to the present invention, it is possible to provide a device for processing information and a method for processing the same, both being capable of executing processing in response to traveling situations of a vehicle. As a result, safety is further improved.

The present specification includes part or all of the contents as described in the specification and/or drawings of Japanese Patent Application No. 2008-256947, which is a priority document of the present application.

BRIEF DESCRIPTION OF DRAWINGS

FIG. 3 is a block diagram of an own-vehicle traveling section.

FIG. 4 is a task table of multi-applications in a general-road traveling mode.

FIG. 5 is a task table of the multi-applications in an expressway traveling mode.

FIG. 6 is a task table of the multi-applications in the general-road traveling mode.

FIG. 7 is a task table of the multi-applications in the expressway traveling mode.

FIG. 8 is a task table of the multi-applications in an inter-vehicle distance control traveling mode.

FIG. 21 is an explanatory diagram for showing the applications of Control/Alarm table.

FIG. 27 is an explanatory diagram for showing the task table before start of a vehicle.

FIG. 28 is an explanatory diagram for showing the task table immediately after start of the vehicle.

FIG. 29 is an explanatory diagram for showing the task table of low-speed traveling of the vehicle.

FIG. 30 is an explanatory diagram for showing the task table in an energy-saving traveling mode.

FIG. 31 is an explanatory diagram for showing the task table of another embodiment in the energy-saving traveling mode.

FIG. 32 is an explanatory diagram for showing the task table of another embodiment in a sport automatic mode.

FIG. 33 is an explanatory diagram for showing the task table of an embodiment in an urban-area traveling mode.

FIG. 34 is an explanatory diagram for showing the task table of a compact car for town traveling.

FIG. 35 is an explanatory diagram for showing the task table of a car for Japan.

FIG. 36 is an explanatory diagram for showing the task table of a car for North America.

FIG. 37 is an explanatory diagram for showing the task table showing another embodiment.

DESCRIPTION OF SYMBOLS

Figure 1:
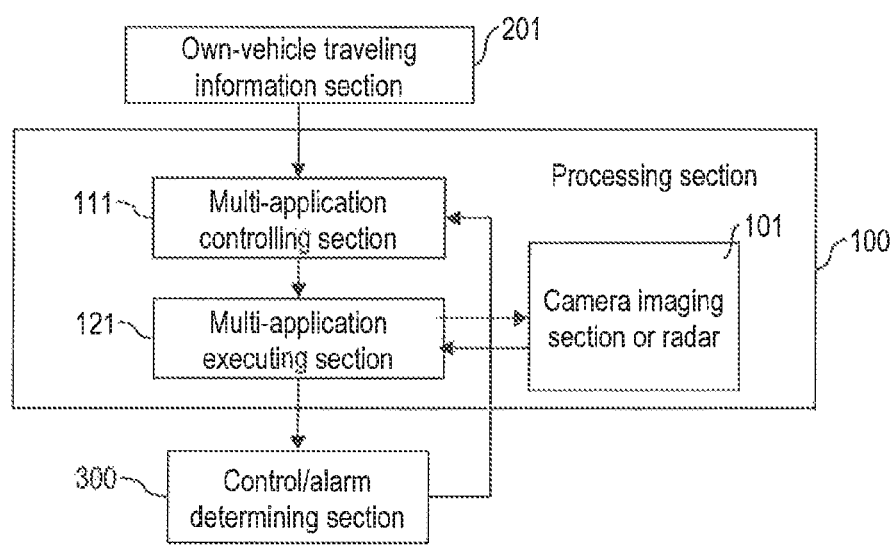
FIG. 1 is a block diagram showing a configuration of a road-environment recognition image processing device.

100: Processing section
101: Camera imaging section
111: Multi-application controlling section
121: Multi-application executing section
130: Lane recognition application
140: Pedestrian detection application
150: Vehicle detection application
160: Automatic lighting application
170: Mark detection application
180: Road-surface mark detection application
201: Own-vehicle traveling information section
300: Control/Alarm determining section
1100: Essential function section
1130: Lane recognition (essential version)
1140: Pedestrian detection (essential version)
1150: Vehicle detection (essential version)
2100: Additional function section
2130: Lane recognition (additional version)
2140: Pedestrian detection (additional version)
2150: Vehicle detection (additional version)

BEST MODE FOR CARRYING OUT THE INVENTION

One embodiment will be described by use of the drawings. The embodiment mentioned below contains technical concepts which meet various needs desirable as a product. Thereamong, several will be described in the embodiment mentioned below. It is to be noted that a content described as the above-mentioned "Problems to be Solved by the Invention" or the object is one of "Problems to be Solved by the Invention" or objects to be achieved, all of which will be described later. Besides, such content has resolved various problems which will be described below, and has achieved objects.

In the embodiment described below, in an on-vehicle camera in which a plurality applications are mounted, in limited processor performance, ingenuity is exercised such that both of executing more applications for pursuing convenience and of securing a processing cycle of the application associated with safety for emergency response are made compatible. Here, the application for pursuing the convenience includes, for example, processing such as mark recognition or road-surface mark recognition in order for a driver to be able to drive more comfortably. Additionally, the term "emergency" means a state as would be determined to require control for avoiding collision or traffic-lane departure. The application associated with the safety indicates the processing such as pedestrian detection 140 or vehicle detection 150, each for determining the collision, or lane recognition 130 for determining the traffic-lane departure. Results of the above-mentioned recognition processing are used for determining how a vehicle is controlled in an emergency state. Thus, it is desirable that an update cycle of the results of the recognition be shorter.

In the embodiment mentioned below, in the on-vehicle camera in which the plurality of applications are mounted, at the time of emergency, the processing cycle of the application associated with the safety is shortened, thereby securing the safety; at the time of normal traveling, more applications are operated by means of time sharing and the convenience is secured, thereby enabling to make the safety and the convenience compatible.

It is to be noted that in the embodiment mentioned below, as a representative example, a monocular camera is used; however, processing accuracy can be improved by using a plurality of cameras, namely, stereo cameras. The respective basic operations are the same. In the embodiment mentioned below, image processing of the camera is optimum; however, it is also possible to use a radar in place of the camera.

Embodiment 1

Explanation of Configuration of Road-Environment Recognition Image Processing Device First, constituent elements will be described by use of FIG. 1. As one embodiment for executing, by means of time sharing, the plurality of applications (hereinafter, may be described as "multi-applications") capable of dynamically switching the processing cycles of the application based on determination at the normal time or at the time of emergency in vehicle traveling, shown is a configuration of an image processing device (hereinafter, may be described as a "road-environment recognition image processing device") for executing environment recognition of a road by use of information from the on-vehicle camera.

The road-environment recognition image processing device includes a processing section 100 for processing an image from a measurement device 101 such as the camera or the radar, an own-vehicle traveling information section 201, and a control/alarm determining section 300. The processing section 100 processes the information from a device such as the camera or the radar; detects a situation of the road; and make determination. For example, the processing section 100 receives from the measurement device the information for detecting and determining an obstacle including a human or an alternate vehicle in terms of traveling; a white line or a road shoulder, and further, a mark or a signal etc.; or a road state etc. such as a curve. These measurement devices include the above-mentioned devices, for example, the monocular camera or the stereo camera; or the radar using light or the radar using a sound wave. Thereamong, taking image information especially of the camera as a representative example, the measurement device 101 will be explained. In the case where other measurement devices are used, in place of the camera imaging section 101, the processing section 100 can be handled so as to be connected to these measurement devices. Additionally, a combination of the above-mentioned devices may also be adopted. In such case, plural types of measurement devices in place of the camera imaging section 101 are connected to the processing section 100, and the processing section 100 receives the information from these measurement devices.

This embodiment is an example in which the camera imaging section 101 is used as a representative. The processing section 100 is explained by a content in which image processing is executed by using the image imaged by the camera imaging section 101. However, with the same way of thinking, the processing section 100 is also applicable to the processing by use of other information. Based on the determination of the control/alarm determining section 300, a multi-application controlling section 111 determines to execute the processing cycles or operation of the respective functions (described as "ON"); to stop execution (described as "OFF"); or the like. Based on the result, a multi-application executing section 121 executes the respective functions. In the case where a recognition result by the on-vehicle camera is used to execute vehicle control such as collision avoidance or traffic-lane departure avoidance, it is desirable for a recognition processing cycle of the camera to be shorter, compared with the time of normal traveling. Contrarily, at the time of normal traveling having been prepared for the emergency as described above, it is not so much necessary to recognize an external world of the vehicle with the short processing cycle as at the time of emergency. The multi-application controlling section 111 controls the processing cycle or ON/OFF of execution operation, thereby enabling to execute the recognition processing by the camera concerning the collision avoidance or the traffic-lane departure avoidance at the time of emergency with the short processing cycle. Meanwhile, at the time of normal traveling of the vehicle, it is possible to operate the application which pursues the convenience by means of time sharing, and to utilize limited processing capacity of a processor more effectively.

Figure 2:
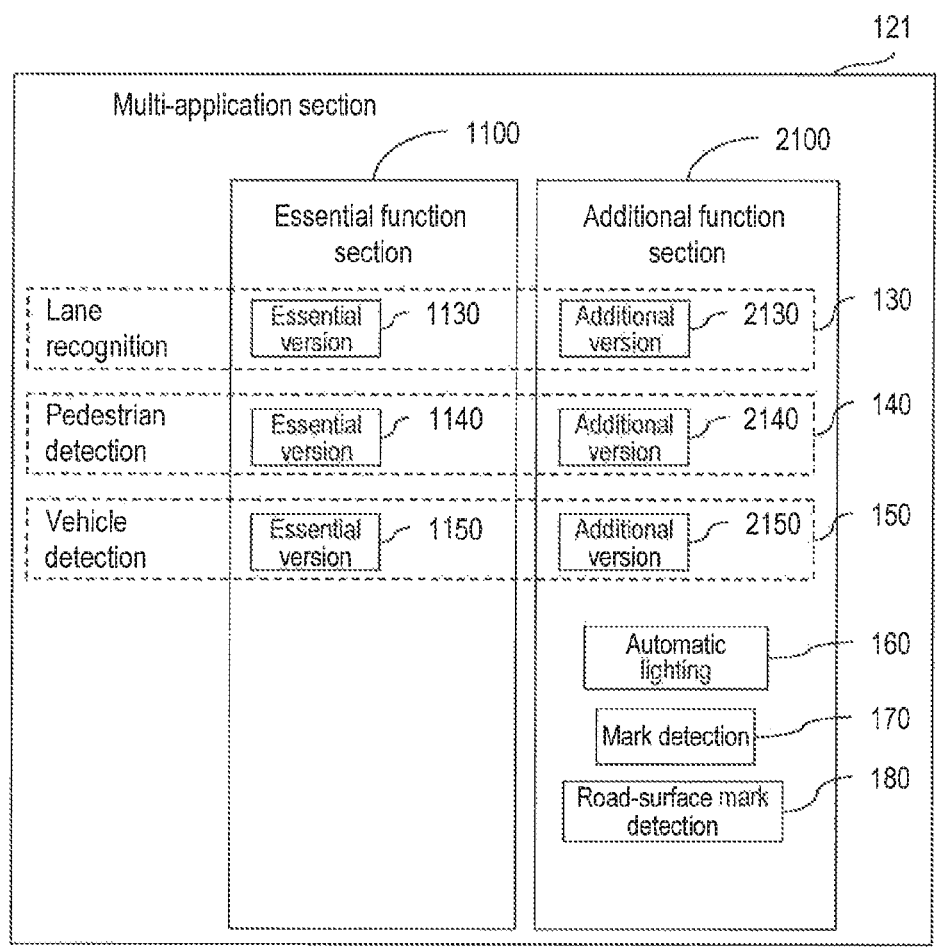
FIG. 2 is a block diagram showing a configuration of an application program retained by a multi-application section.

FIG. 2 shows a detailed configuration of the multi-application executing section 121. In the multi-application executing section 121, all of the applications of the image processing, namely, processing programs of the applications are registered per function. The multi-application executing section 121 is configured such that the respective functions are classified into an essential function section 1100 and into an additional function section 2100. Needless to say, the configuration is separated, so that it is possible to separately execute the essential function section 1100 and the additional function section 2100 with respect to each of a lane recognition application, a pedestrian detection application, and a vehicle detection application, all being shown on the left side of the figure. The essential function section 1100 and the additional function section 2100 may be separated into entirely different programs. In the case of the same processing contents, the programs of the processing contents may be able to be commonly executed. The important is to be able to separately execute the essential function section 1100 and the additional function section 2100 seemingly.

In this embodiment, the functions of the multi-application section 121 shown in FIG. 2 are classified from the perspective of the essential function section 1100 which exerts direct effects on accident prevention and the additional function section 2100 whose primary purpose is to aid more comfortable driving. By registering as the essential function section 1100 the application whose operational assurance is wanted also at the time of emergency such as the time of the collision avoidance or the time of the traffic-lane departure avoidance, the safety is secured. Contrarily, by registering as the additional function section 2100 the application whose operational assurance is not required at the time of emergency; but which provides information useful to a driver at the time of normal traveling, the convenience is pursued. By registering the functions by means of the classification into the essential function section 1100 and into the additional function section 2100, it is possible to more flexibly switch the functions which operate at the time of emergency and at the normal time, and possible to make the safety and the convenience compatible.

A lane recognition application 130 is an image processing function which recognizes the white line from the image imaged by the camera. Regarding the lane recognition application 130, the lane recognition application 130 (an essential version 1130), which is capable of estimating a lateral position and a yaw angle of an own vehicle in a traffic lane required for the traffic-lane departure avoidance expected to exert direct effects on preventive safety, is classified into the essential function section 1100. Additionally, making a situation of the white line in the distance farther from the curve as a detection object, functional partition is performed to the lane recognition application 130 (an additional version 2130), as the additional function section 2100, expected to exert effects on the comfortable traveling, such as deceleration before approaching the curve or steering aid during the curve. In this way, with respect to one application as the lane recognition application 130, a recognition function for traffic-lane departure prevention directly associated with the safety is classified into the essential version; whereas the recognition function for the deceleration before approaching the curve, associated with the convenience, is classified into the additional version. This makes it possible to, at the time of emergency such as the traffic-lane departure, execute only the minimum recognition processing required for the traffic-lane departure avoidance in a preferential manner, and to terminate the recognition processing associated with the convenience, thereby shortening the whole processing cycles.

A pedestrian detection application 140 is also classified into the pedestrian detection application 140 (an essential version 1140) whose operational assurance is performed with respect to a distance which allows collision to be avoided in consideration of a braking distance in response to vehicle speed; and the pedestrian detection application 140 (an additional version 2140) which executes detection processing also with respect to a pedestrian candidate in the farther distance. The pedestrian detection application 140 (the essential version 1140) for securing the safety assumes that a pedestrian be in near distance to some extent, and thus, is set so as to use the image having resolution to some extent, rather than using the image having high resolution, and to place priority on more hastening the update cycle of a detection result. Contrarily, the pedestrian detection application 140 (the additional version 2140) targets the pedestrian in the farther distance, and thus, uses the image having high resolution.

Also regarding a vehicle detection application 150, the vehicle detection application 150 (an essential version 1150), which executes the image processing with respect to a vehicle candidate required for avoiding the collision in consideration of relative speed or the distance to a leading vehicle and of an own-vehicle rudder angle, is classified into the essential function section 1100. The vehicle detection application 150 (an additional version 2150), which makes the vehicle in the farther distance as the detection object with an aim of detecting the vehicle earlier; improving a detection rate; or controlling an inter-vehicle distance etc., is classified into the additional function section 2100. A policy concerning the resolution or the processing cycle is similar to the policy of the pedestrian detection application 140. The pedestrian detection application 140 or the vehicle detection application 150 registers the recognition processing for the collision avoidance in the essential version, and registers in the additional function section the processing in the distance etc. which is not directly used for the vehicle control by means of the classification, thereby actualizing control of the processing cycle per function or ON/OFF of the function. Such dynamic control of the processing cycle of the multi-applications effectively actualizes the securing of the safety at the time of emergency and the convenience at the normal time.

An automatic lighting application 160 is an application which recognizes the image from the camera, thereby detecting brightness of the external world and controlling ON/OFF or a direction of a headlight; and the convenience is improved through the automatic control. However, provided that the control is not automatically executed, the driver can operate the ON/OFF or the direction of the headlight, as necessary. In conjunction with the detection of the leading vehicle, a high beam and a low beam are controlled. In conjunction with the lane recognition 130; an own-vehicle prediction course from a vehicle-speed sensor 211 and a rudder-angle sensor 212 of the own-vehicle traveling information section 201; or the own-vehicle prediction course from a car navigation system 215, an irradiation angle of the headlight is controlled in a direction of the curve. Further, in conjunction with road-surface mark detection 180, the automatic lighting application 160 is used for the control of the irradiation angle at a traffic intersection or the like. The automatic lighting application 160 aims to aid more comfortable driving, and the whole of this application is classified into the additional function section 2100. A mark detection application 170 detects a road mark such as a speed limit, and provides this information to the driver, thereby aiming to aid the comfortable driving. Thus, the whole of this application is classified into the additional function section 2100. The road-surface mark detection application 180 is a function which detects an indication of the speed limit on a road surface etc., or detects a pedestrian crosswalk, thereby detects the information of driving aid to the diver, such as making positional information of the navigation system high accurate one. Thus, the whole of this application is classified into the additional function section 2100.

FIG. 3 shows a detail of the own-vehicle traveling information section 201 of FIG. 1. The own-vehicle traveling information section 201 transmits the information regarding the traveling of the own vehicle via an on-vehicle communication network to the processing section 100. The own-vehicle traveling information section 201 includes the vehicle-speed sensor 211, the rudder-angle sensor 212, a turning indicator 213, application operation 214, and the car navigation system 215, of the own vehicle.

[Explanation of Task Table]

Each of FIGS. 4 to 8 shows a status of the task table at the time of emergency and at the time of control in the respective traveling modes of the vehicle in order to manage the execution of the applications. Based on the information of this status task table, determined is with or without the execution; the priority of the execution; execution frequency; conditions of the information to be used; or the like, each being associated with the essential section (version) or the additional section (version) of the objective application. Accordingly, the processing conditions etc. of the application can be easily changed by changing the content of the task table. First, the content of the task table will be explained hereinafter. The respective functions are classified in a longitudinal axis; an individual item to be set in the task table is arranged in a lateral axis; and the individual item is changed at the time of switching of the modes, at the time of emergency, or at the time of control, whereby the control per item of the respective functions is executed, and the processing cycles of the multi-applications are changed. In this way, the information of the task table is dynamically written over in response to the own-vehicle traveling information or external-world recognition result, whereby this system has been configured so as to correspond to system requirements which change in response to the situations and make compatible the securing of the safety at the time of emergency and the securing of the convenience at the normal time.

Next, the individual item to be set in the task table will be described hereinafter. An effective flag is a flag for determining whether the function should be operated in the selected mode, in which "ON" indicates to be an objective for execution, whereas "OFF" indicates an execution stop. Namely, when the effective flag is turned "ON", the function is executed, whereas when the effective flag is changed to "OFF", the function is not executed. At the time when the vehicle travels on the general road, which is shown in FIG. 4, all of the applications starting from the lane recognition (essential version), the lane recognition (additional version) to the last road-surface mark detection, all being shown as the items on the left side, become the objects for execution, and are executed in accordance with priority orders. Meanwhile, when the vehicle is traveling on an expressway, as shown in FIG. 4, in the essential-version application 1140 of the pedestrian detection application 140 or the additional-version application 2140 of the pedestrian detection application 140, the item of its effective flag is "OFF." It cannot be considered that, during the traveling on the expressway, the pedestrian is on the road on which the vehicle is traveling. Thus, "OFF" is set in the effective flag in such a manner that the essential-version application 1140 or the additional-version application 2140 of the pedestrian detection application 140 is not executed. Additionally, it is rare for the mark to be indicated on the road surface. Thus, there is no need also for this application to be executed, and the effective flag is changed to "OFF." This makes it possible to allocate time to the processing of other applications in the traveling on the expressway.

Under the condition where a traveling environment has changed from general-road traveling in FIG. 4 to expressway traveling, regarding the lane recognition 130, the pedestrian detection 140, and the vehicle detection 150 of the applications made up of the essential function section 1100 and the additional function section 2100, in the case where the effective flag of the essential function section 1100 is "OFF," the effective flag of the additional function section 2100 of the identical application is inevitably "OFF." For example, in the case of the lane recognition 130, in a state where the lane recognition 130 (the essential version 1130) stops its operation with its effective flag "OFF," there is no case where merely the lane recognition 130 (the additional version 2130) operates with the effective flag "ON." In the case where the essential section is "ON," the function belonging to the additional function section 2100 is controlled in response to the situations.

"ON" and "OFF" of the essential function section 1100 are changed when mode setting as to whether the vehicle is currently traveling on the expressway or on the general road etc., is performed based on the information of the own-vehicle traveling information section 201. For example, during the expressway traveling, on the assumption that the pedestrian would not be on the expressway, it is considered that an allocation of the processing by the processor to other functions can result in more comfortable and safe driving for the driver, compared with the operation of the pedestrian detection function. Thus, the entire of the pedestrian detection application is "OFF," and "ON" as well as "OFF" are controlled in order to place the priority on the processing of other functions or shortening processing time for one cycle during high-speed movement.

"ON" and "OFF" of the essential function section 2100 are controlled based on recognition information from the own-vehicle traveling information section 201 and the application. Especially at the time of emergency, in order to put the priority on the function associated with the control for the safety, there are many cases where the additional function is turned "OFF." Contrarily, at the time of normal traveling or the like, in the case where the processing cycle of the essential function associated with the safety is not necessarily short, the processing of the processor is allocated to the additional function, thereby attempting to improve the convenience.

The switching of execution conditions of the application as described above is based on the switching of the traveling environments from the general-road traveling to the expressway traveling. The switching of the traveling environments in this way leads to the change of the applications of to be executed, and leads to the change of the priority or other execution conditions. Methods for detecting the switching of the traveling environments include, for example, the switching of a gear change, the change in vehicle speed, passing through a tollgate of a toll road such as the expressway, or the information from the car navigation system.

The priority order indicates the mutual priority order in the execution of the respective functions (applications), and indicates that the one having a smaller number is the function (application) having the higher priority. For example, in the case where the curve is detected in the distance, whereby the control of the deceleration is executed, execution start time of the function having the high priority can be hastened by lowering the priority order of the additional function (application) not associated with the deceleration control; namely; the execution in the short cycle is allowed. Contrarily, through the delay, or the like, of the execution start time of the additional function (application) having the lowered priority, the execution cycle is lengthened. The items of the processing in FIGS. 4 to 8 indicate the number of processing in one cycle shown in FIG. 10. One cycle in the present image processing device indicates a one-time loop of a series of the processing, shown in FIG. 10. A design has been made in such a manner that even the identical function has the smaller number of processing as its priority becomes lower. The processing [1/1] of the lane recognition 130 (the essential version 1130) means that the program is executed once in one cycle. The processing [⅓] of the automatic lighting 160 serving as the additional function means that the function is executed once in three cycles.

For example, concerning the function (application) of a curvature calculation part of the lane recognition application 130 etc., given that a curvature of the road does not sharply change, it is not necessary to be repeatedly executed with the high priority and in the short processing cycle. A short processing cycle results in high accuracy. However, in such case that there in another processing on which the priority is placed, there is nothing wrong with the processing using [½]. Whereat, in the case where there is the function on which the priority should be placed compared with the function (application) of the curvature calculation part, regarding the execution cycle of the function (application) of the curvature calculation part, it is possible to change its processing cycle as an adjustment item. In this case, the contents in columns of the processing shown in FIGS. 4 to 8 are [½]. In the case where the processing time of the application having the high priority is deficient, the execution cycle of the application having the low priority is lengthened by a predetermined procedure.

In the case of the additional-version application 2140 of the pedestrian detection application 140, the additional-version application 2150 of the vehicle detection application 150, the mark detection application 170, the road-surface mark detection application 180, or the like, if a processing level is lowered, an execution order drops, and execution timing is somewhat delayed. It is considered that the number of recognition processing from entering in a detection distance is lessened, so that the detection rate is somewhat lowered etc. However, in the case where there is the function, namely, the application more important than this lowering, processing start of a priority matter is hastened by adjusting the processing cycle, whereas a non-priority matter is controlled such that its processing start is delayed. During the control such as speed suppression during the curve, it is important to early execute, with the high priority, the mark detection 170 or a curve recognition application for controlling the deceleration rather than the lowering of the detection rate of a road-surface mark in some degree.

In FIGS. 4 to 8, the item of the resolution indicates a size of an input image to be used for image recognition. The maximum resolution of the camera is indicated as [1,1]. Regarding notation of [a,b], "a" indicates the resolution in a lateral direction of the image, whereas "b" indicates the resolution in a longitudinal direction of the image. For example, in the case where the maximum resolution is 768×240, the resolution of the lane recognition 130 (the essential version 1130) which inputs the image of 256×240 as the input image is indicated as [⅓,½], which indicates that the lateral resolution is ⅓ of the maximum resolution and the longitudinal resolution is ½ of the maximum resolution. That is, FIGS. 4 to 8 define an amount of the information of the image or the like and the resolution, necessary for the respective applications. In the case of the high resolution and much amount of the information, the processing requires time. In light of a purpose of the application, a degree of the adequate resolution is determined per application. Based on this resolution, the multi-application executing section 121 of FIG. 1 transmits an instruction to the camera imaging section 101 which is the measurement device 101, and setting of the measurement device such as the camera is changed. It is to be noted that an output, namely, the image having the high resolution may be retrieved from the measurement device 101; in accordance with values of the item of the resolution, the resolution may be lowered; and the processing may be executed. In the embodiment from FIGS. 4 to 8, executed is the processing in which the output, namely, the image having the high resolution is retrieved from the measurement device 101, and in accordance with the values of the item of the resolution, the resolution is lowered.

In the case where in the lane recognition application 130 or the pedestrian detection application 140, the priority is placed on positional accuracy of the detection result, or the farther distance is the detection object, it is desirable to use the image having the high resolution. However, it is likely that calculation time will increase due to the use of the high-resolution image, and because of its processing load, an emphasis, such as not being in time for the processing cycle, will be given. The resolution is adjusted before executing the application in accordance with the necessary resolution in response to the conditions such as detection position accuracy, a detection object distance, the processing cycle. For example, in the case of assuming the traffic-lane departure avoidance, a lateral position of the lane with respect to the vehicle or a yaw angle requires the recognition accuracy in some degree, however, a curvature value in the distance, a lane position in the distance farther from a prediction position of the traffic-lane departure, or the like is not so much important. Under the circumstance where the vehicle is controlled for the traffic-lane departure avoidance, the image having the low resolution is used to reduce processing costs, whereby the update cycle of the lateral position of the lane or the yaw angle to be used for the vehicle control is hastened, and the higher-level vehicle control is actualized.

The detection distance indicates the farthest distance which each of the functions targets for the recognition. For example, that the detection distance of the pedestrian detection application 140 (the essential version 1140) in a normal mode is 40 [m] means that the pedestrian in the distance farther from 40 [m] is not included in the detection object. In terms of the pedestrian detection application 140, in the case where the pedestrian having high-potential collision is adjacently recognized, and the vehicle control is predicted to be necessary, it is not important to detect the distance beyond an object range of the vehicle control. It is possible to reduce the processing costs by precluding the distance from the object; to update a pedestrian position with a high frame rate; and to control the collision avoidance with a higher level.

[Explanation of Processing Flow by Use of Task Table]

Figure 9:
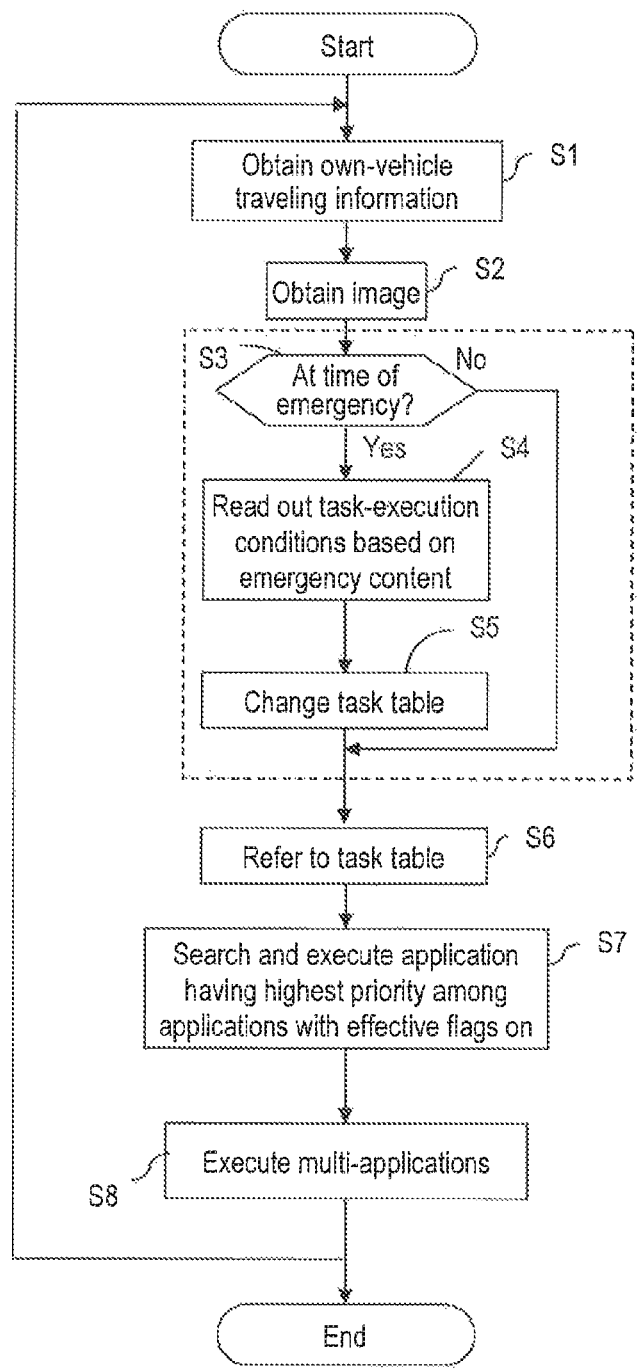
FIG. 9 is a flowchart of application execution.

FIG. 9 shows a processing flow of the multi-applications by use of the task table. For example, the execution is made per execution timing R shown in FIGS. 10 to 14. In Step S1, the information regarding the own-vehicle traveling or the information regarding the vehicle traveling environment is obtained. The own-vehicle traveling information includes the vehicle speed by the vehicle-speed sensor 211, a yaw rate by the rudder-angle sensor 212, turning-indicator operation information by the turning indicator 213, application operation information by the application operation 214, and car navigation information by the car navigation system 215, of the own vehicle. These information are obtained.

In Step S2, obtained is the image imaged in the camera imaging section 101. As mentioned above, the camera imaging section 101 may be the radar, and generally, is the measurement device such as a sensor, and retrieves the output from the measurement device.

In Step S3, based on the own-vehicle traveling information obtained in Step S1 and the recognition result, of an image processing application, to be obtained in Step S6, estimated is the time until an emergency event occurs, the time which starts the control for avoiding it, or possibility that the emergency event occurs. Based on this, determined is whether the processing for aiding the comfortable driving or the emergency processing is required. In the case where the emergency processing is not required, a step moves to the processing of Step S6. In the case where the emergency processing is required, the processing of Step S4 is executed, and the step moves to the processing of Step S5 (an estimation method per application will be described later in the part of the timing). In Step S4, in the case of being determined, in Step S3, to be at the time of emergency in view of the estimated result, the content of the emergency is discriminated; reads out the task table preliminarily set per content of the emergency; and based on the content read out in Step S5, change the task table of the respective functions so as to meet the system requirements in response to the content of the vehicle control.

Next, in Step S6, reference is made to the changed task table; by Step S6 and Step S7, selected is the application, of the respective applications, having the highest priority order among tasks whose effective flags are turned "ON"; and the execution is made in Step S8. As shown in FIGS. 4 to 8, per function of the respective applications, the table is configured such that the effective flag, the priority order, the processing cycle, the resolution, and the detection distance are described. Rewriting of this table leads to the execution of the setting etc. of starting from "ON" and "OFF" of the operation of the application to the processing cycle, the resolution, the detection distance. The multi-application executing section 121 refers to this table, thereby controlling the function.

For the high-level control in the emergency control or for more prompt control start, the high frame rate of the processing cycle is important. Based on the vehicle traveling information and the external-world recognition result, executed is the setting of the effective flag, the change of the priority order, the processing cycle, the resolution of the image to be used for the image processing, the detection distance, or the like, whereby the processing with the high frame rate is executed. In the case of being changed to the image having the low resolution, after considering that by such change, the detection distance is shortened; the detection rate is lowered; or in the lane recognition 130, the recognition accuracy (the lane position or the yaw angle with respect to the lane) is lowered; and more than these matters, when a system side determines that it is important to update the recognition result with the high frame rate, the lowering of the resolution is selected. Contrarily, in the case where the control is not determined to be necessary, if it is important to make the farther distance the detection object, the task table is changed such that the frame rate becomes late, instead of using the high-resolution image. The reference is made to the task table which has been changed in Step S6; based on the information of this task table, the application to be executed is determined in Step S7; and the execution is made in Step S8.

[Explanation as to Mode Switching of General Road and Expressway]

Figure 10:
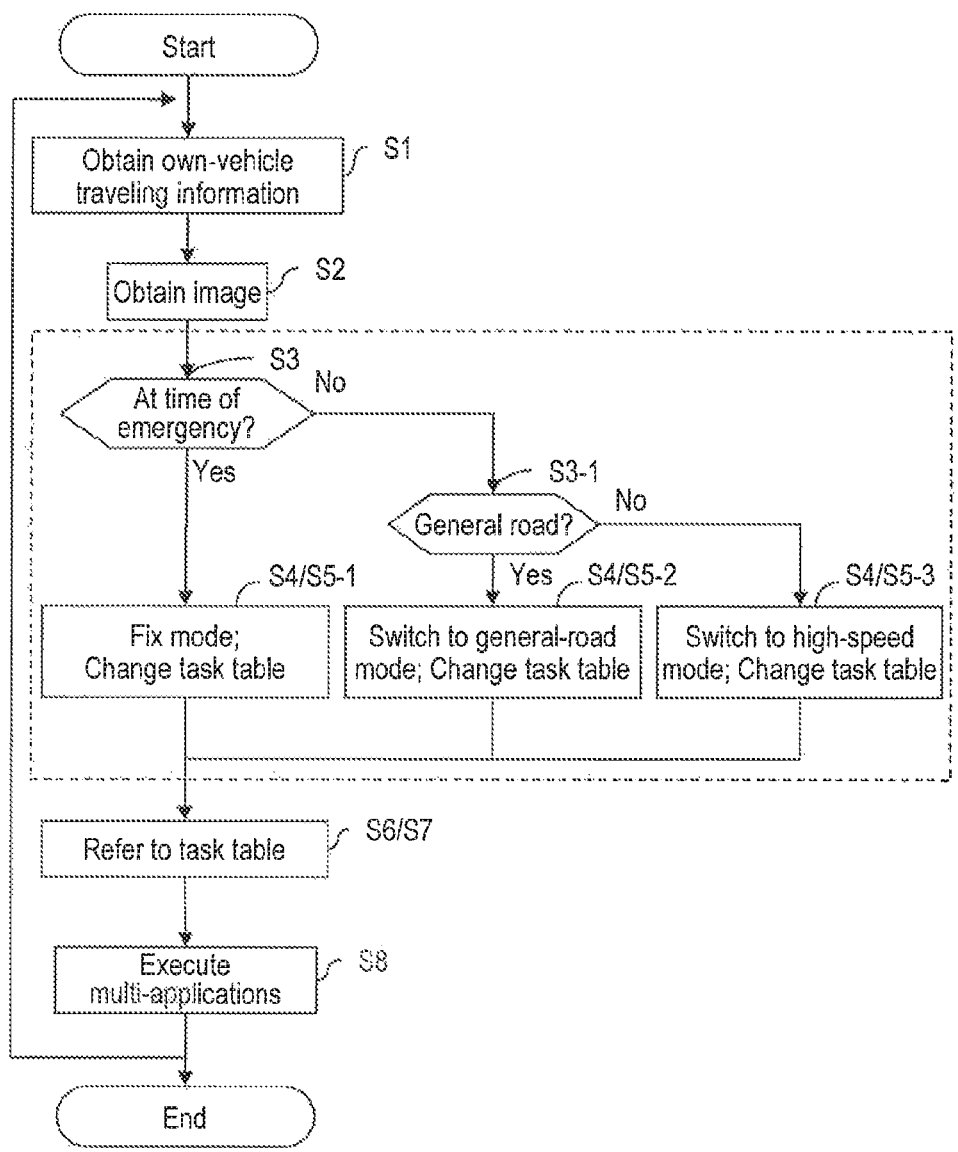
FIG. 10 is a flowchart of the application execution in consideration of a traveling environment.

FIG. 10 explains the processing which further changes the execution condition of the application to be executed based on the information of the traveling environment in the processing flow of FIG. 9. It is to be noted that the same reference numeral denotes the same processing, the same function. The point of determining with or without the time of emergency in Step S3 is the same. When it is determined that the emergency processing is necessary, executed is the processing similar to the processing which executes Step S4 or Step S5 in FIG. 9. In FIG. 10, an expression is made as Step S4/S5-1 in combination of Step S4 or Step S5, however, its content is the same. Thereafter, in FIG. 9, Step S6 and Step S7 are executed. However, their contents are also the same, and are described as Step S6/S7 in FIG. 10. Subsequently, the selected application is executed in Step S8.

Meanwhile, even in the case where there is no urgency, in FIG. 10, an environmental condition of the traveling vehicle is determined in Step S3-1. One such example is the determination as to whether the road is an automobile-dedicated road, such as the expressway, or the general road. For example, when the own-vehicle traveling information section 201 of FIG. 1 or FIG. 3 determines to be the general road by means of the car navigation system 215 or the application operation 214 from a screen of the car navigation system, the task table, shown in FIG. 4, suitable for the traveling on the general road is read out in Step S4/S5-2, and the task table has the content of FIG. 4. Meanwhile, when it is determined to be during the traveling on the expressway, Step S4/S5-3 is executed, and the content of the task table becomes the content of FIG. 5.

Figure 11:
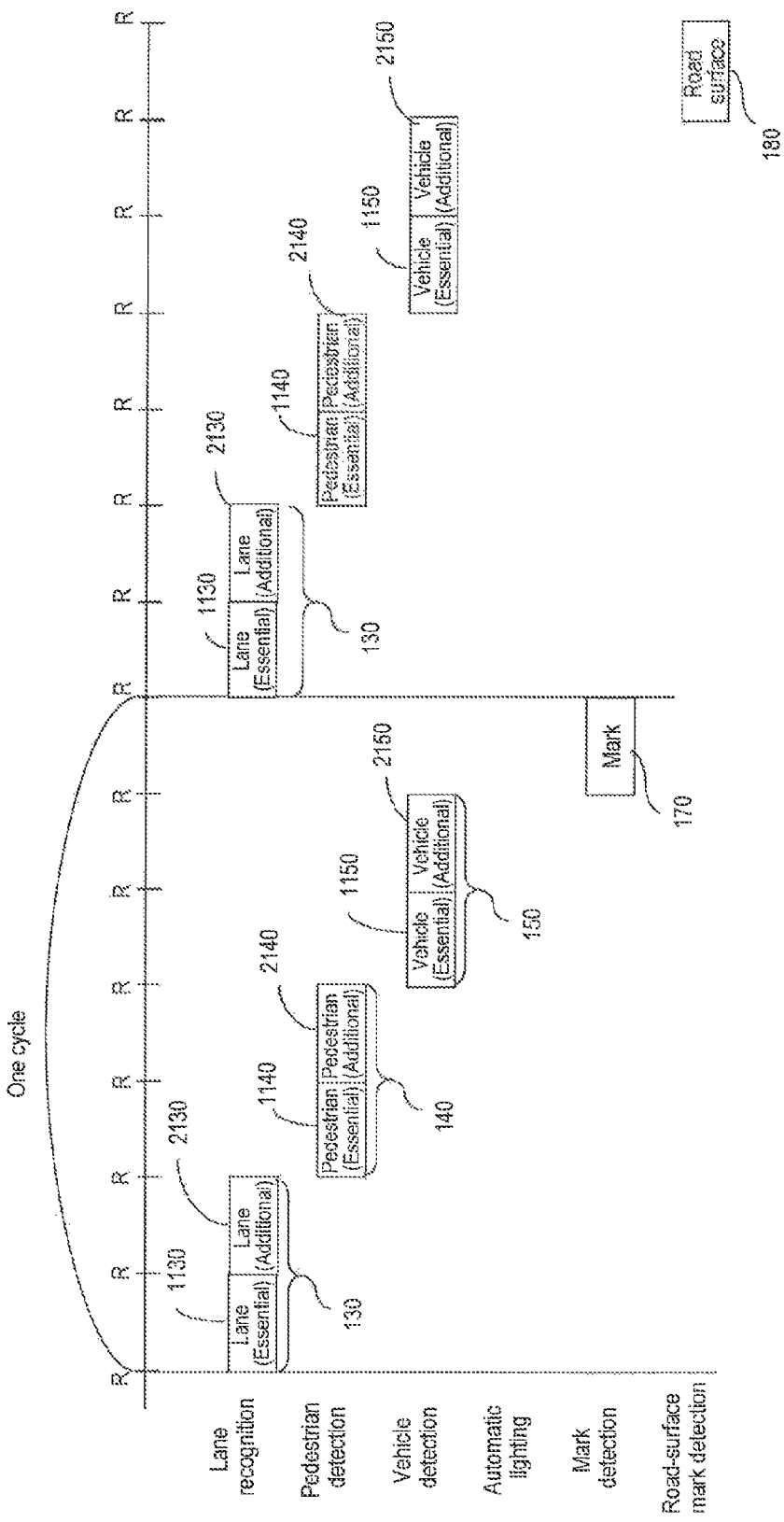
FIG. 11 is an execution timing chart of the multi-applications in a general-road mode.

FIG. 11 shows the execution of the applications based on the task table shown in FIG. 4. Regarding the lane recognition 130 (essential version 1130) or the lane recognition 130 (additional version 2130), the pedestrian detection (essential version) 1140 or the pedestrian detection (additional version) 2140, the vehicle detection (essential version) 1150 or the vehicle detection (additional version) 2150, all of the effective flags are "ON" as shown in FIG. 4, and all of the columns of the processing are [1/1]. Accordingly, the execution is made once in one cycle. In FIG. 11, a square box indicates an execution status of an application program. It turns out that all of the lane recognition 130 (essential version 1130) or the lane recognition 130 (additional version 2130), the pedestrian detection (essential version) 1140 or the pedestrian detection (additional version) 2140, the vehicle detection (essential version) 1150 or the vehicle detection (additional version) 2150 are executed once in one cycle. One cycle is made up of seven of the execution timing R in this embodiment. Meanwhile, the automatic lighting application 160 is executed once in five cycles, and has not been executed in a range of FIG. 11. Additionally, the mark detection application 170 is executed once in three cycles, and has been executed in the left cycle of FIG. 11, however, is not executed in the next cycle. The road-surface mark detection application 180 is executed once in three cycles, and has not been executed in the left cycle of FIG. 11, however, is executed in the next cycle. In this way, the execution is made in accordance with the task table of FIG. 4.

Figure 12:
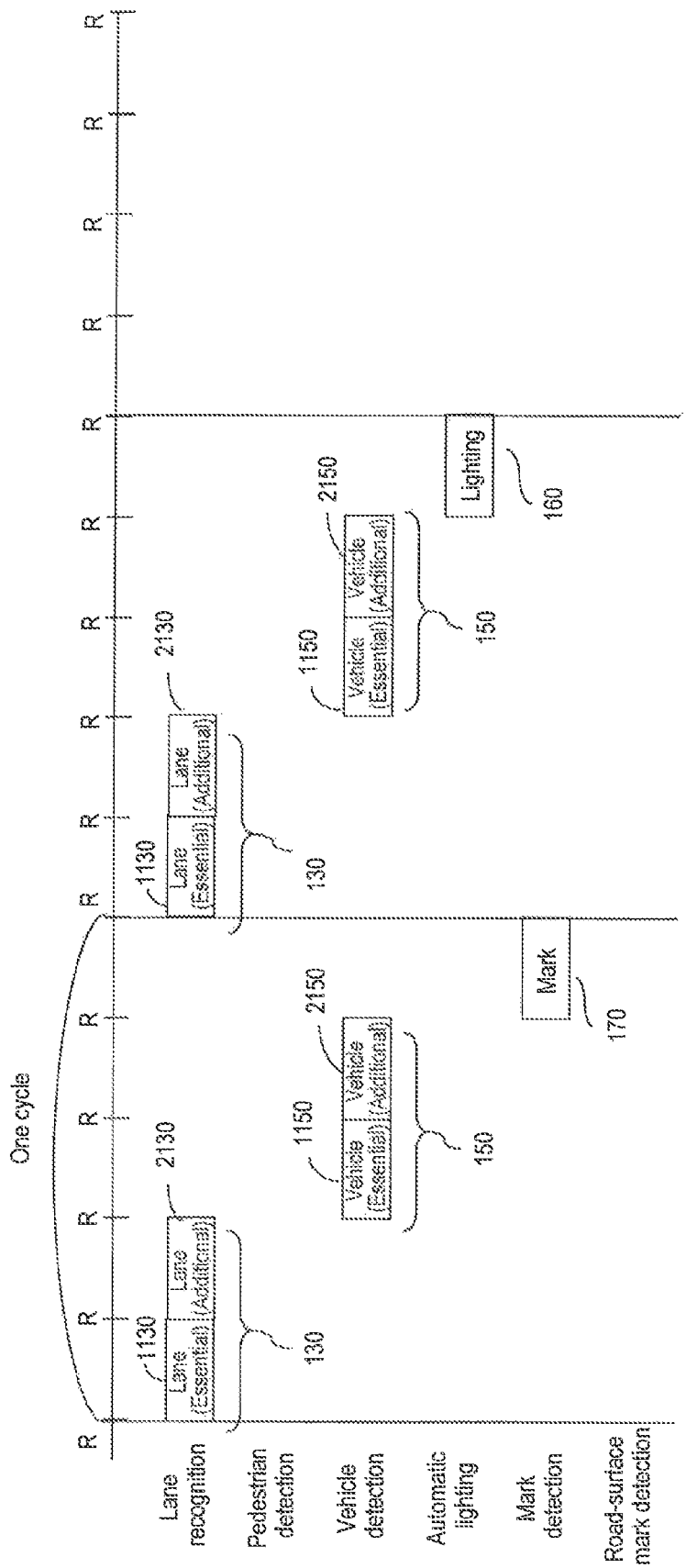
FIG. 12 is an execution timing chart of the multi-applications in an expressway mode.

Meanwhile, in the case of traveling on the expressway, as shown in FIG. 5, neither of the pedestrian detection (essential version) 1140 nor the pedestrian detection (additional version) 2140 is executed. As shown in FIG. 12, when referring to the execution of the application program, neither of the pedestrian detection (essential version) 1140 nor the pedestrian detection (additional version) 2140 is executed. Further in FIG. 5, the effective flag of the road-surface mark detection application 180 is "OFF," and the execution is not made also in FIG. 12. In this way, in a flow of FIG. 10, depending on whether the traveling is on the general road, or the traveling is on the expressway or the automobile-dedicated road in Step S3-1, the task table is selected, and the execution of the application is different as shown in FIG. 11 or FIG. 12. As mentioned above, in the case of traveling on the general road, the braking distance is calculated from the speed limit on the general road, and the distance in which the distance having a predetermined value is added to the braking distance is made as the essential function of the pedestrian detection 140 and the vehicle detection 150. According to this, the design is made in such a manner that the obstacle in the timing of starting braking is inevitably included in the detection object of the essential function section 1100, thereby attempting to secure the safety. Regarding the lane recognition 130, for the control of the traffic-lane departure etc., important is the angle or the lateral position of the vehicle with respect to the lane in an adjacent area rather than in the distance, so that the object distance is set so as to be shorter.

Further in Step S3-1 of the flow of FIG. 10, in the case of determining not to be the general road based on the own-vehicle traveling information, the task table is rewritten to the task table for a high-speed mode at the normal time shown in FIG. 5. Considered is that rather than operating the pedestrian detection function on the expressway where it is highly unlikely that the human is walking, it is the more effective system for the driver to operate other recognition processing in the short processing cycle. In the high-speed mode, the effective flag of the pedestrian detection 140 is "OFF" in each of the essential function version and the additional function version. Concerning the expressway where the vehicle speed is high, for securing the safety, the detection object distance of the respective functions is set to be long. In the case of executing the control due to the high vehicle speed, it is desirable to be able to obtain the recognition result with the higher frame rate. The pedestrian detection 140 is "OFF," thereby reducing the processing costs; actualizing the high frame rate at the time of emergency control; and responding also to the control which becomes difficult due to the high vehicle speed.

[Flow of Change Processing to Emergency Mode]

Next, an explanation will be made as to the general-road mode: the time of emergency control of pedestrian collision prevention.

(1) Explanation of Content of Task-Table Change

Figure 18:
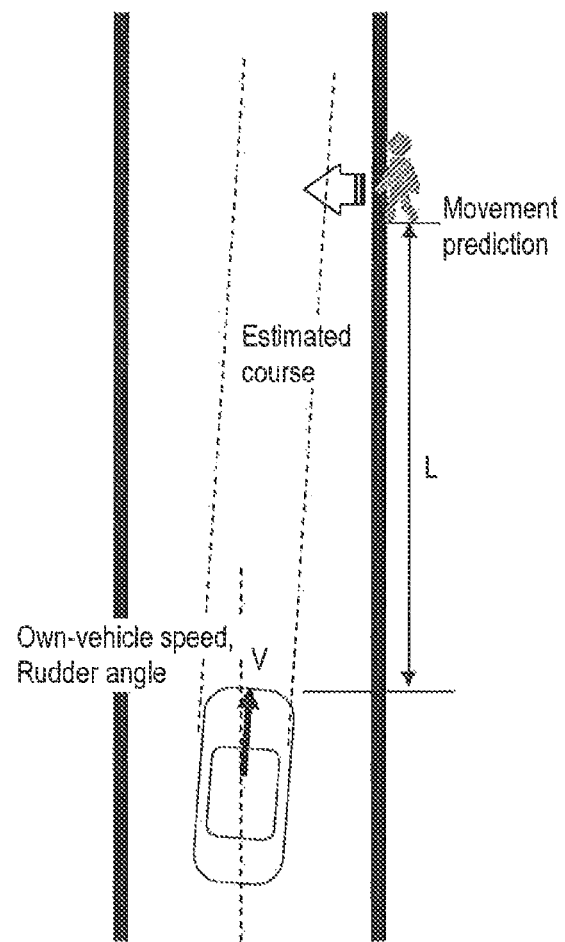
FIG. 18 is an explanatory view for showing time required for pedestrian collision avoidance.

In Step S3 of FIG. 9 or FIG. 10, the determination of whether or not the control or an alarm for collision prevention against the pedestrian is required is made by the pedestrian detection 140. A pedestrian position with respect to the own vehicle can be detected, in chronological order, by an external-world recognizing device such as the pedestrian detection 140 or the radar. Thus, this results in the execution of motion estimation of the pedestrian. As shown in FIG. 18, a time to collision (TTC) is calculated from the vehicle speed of the own vehicle and the distance to the pedestrian, and further, the possibility of collision is estimated from a pedestrian lateral position (Lateral) at a collision-expected time which follows by TTC seconds. The time to collision (TTC) is calculated as follows.

Time to collision (TTC)=distance to pedestrian (*L*)/own-vehicle speed (*V*)

Pedestrian lateral position (Lateral)=(own-vehicle speed (*V*)×cos θ−*V* ped)×time to collision (TTC)

Vehicle yaw angle: θ

Lateral movement speed of pedestrian: V ped

Figure 16:
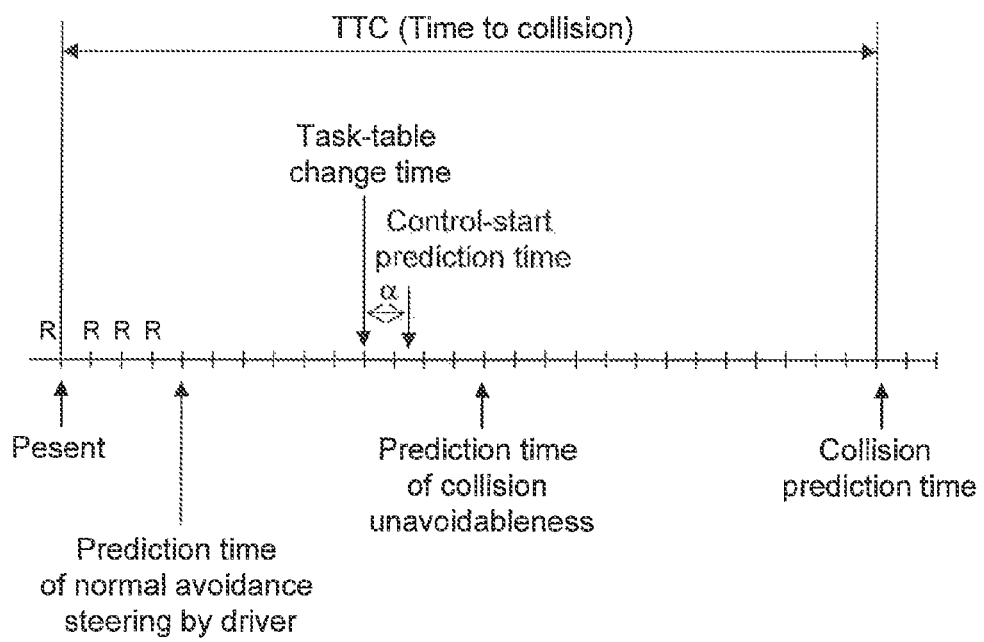
FIG. 16 is an explanatory diagram showing task-table change timing.

In automatic brake control or the like, in order for the driver not to neglect avoidance steering, it is desirable to be slower than the avoidance steering which the driver performs in the normal driving, and further for avoiding the collision, it is desirable to be earlier than the timing at which the collision becomes unavoidable. Accordingly, as shown in FIG. 16, when TTC is between the normal avoidance steering by this driver and the timing at which the collision is unavoidable, as well as at the timing earlier, by predetermined value α, than a control-start prediction time, the task table is rewritten. The task table is set earlier than control start timing, and the cycle of the application is changed, whereby it is possible to execute the vehicle control equivalent to the vehicle control in the case where the recognition processing is executed in the short cycle at all times on the vehicle processing side. In addition, the timing of rewriting the task able is selected slower compared with the avoidance steering which the driver performs in the normal driving, whereby during the normal driving, it is attempted that multi-tasks are not unreasonably changed to the task tables for the time of emergency control. Accordingly, attention is paid also to the convenience.

(2) Explanation of Content of Task-Table Change

In order to control the pedestrian collision prevention, the pedestrian detection 140 (essential version 1140) is the essential function, and especially during the control, it is necessary to be processed in the shorter cycle. Therefore, in task-table change timing, the step follows a loop of Step S5 in FIG. 9, and executes change processing of the task table. The task table in FIG. 6 shows a modified example of the task table at the time of emergency mode of the pedestrian collision prevention in the general-road mode. Also at the time of emergency, operated at all times are three of the lane recognition 130 (essential version 1130), the pedestrian detection 140 (essential version 1140), and the vehicle detection 150 (essential version 1150), each being registered in the essential function. The safety is secured by retaining the priority of the function likely to be used for the emergency control. Contrarily, at the time of emergency, the processing time for one cycle is shortened by lowering the priority, the accuracy, or the processing cycle of an additional function part, whereby it is possible to accelerate the update cycle of the recognition result of the pedestrian and to execute the control having high accuracy. The processing to be used for the additional function at the normal time is allocated to the processing of the safety to be used for the control at the time of emergency, thereby executing multi-application control in which attention is paid to the safety.

Figure 13:
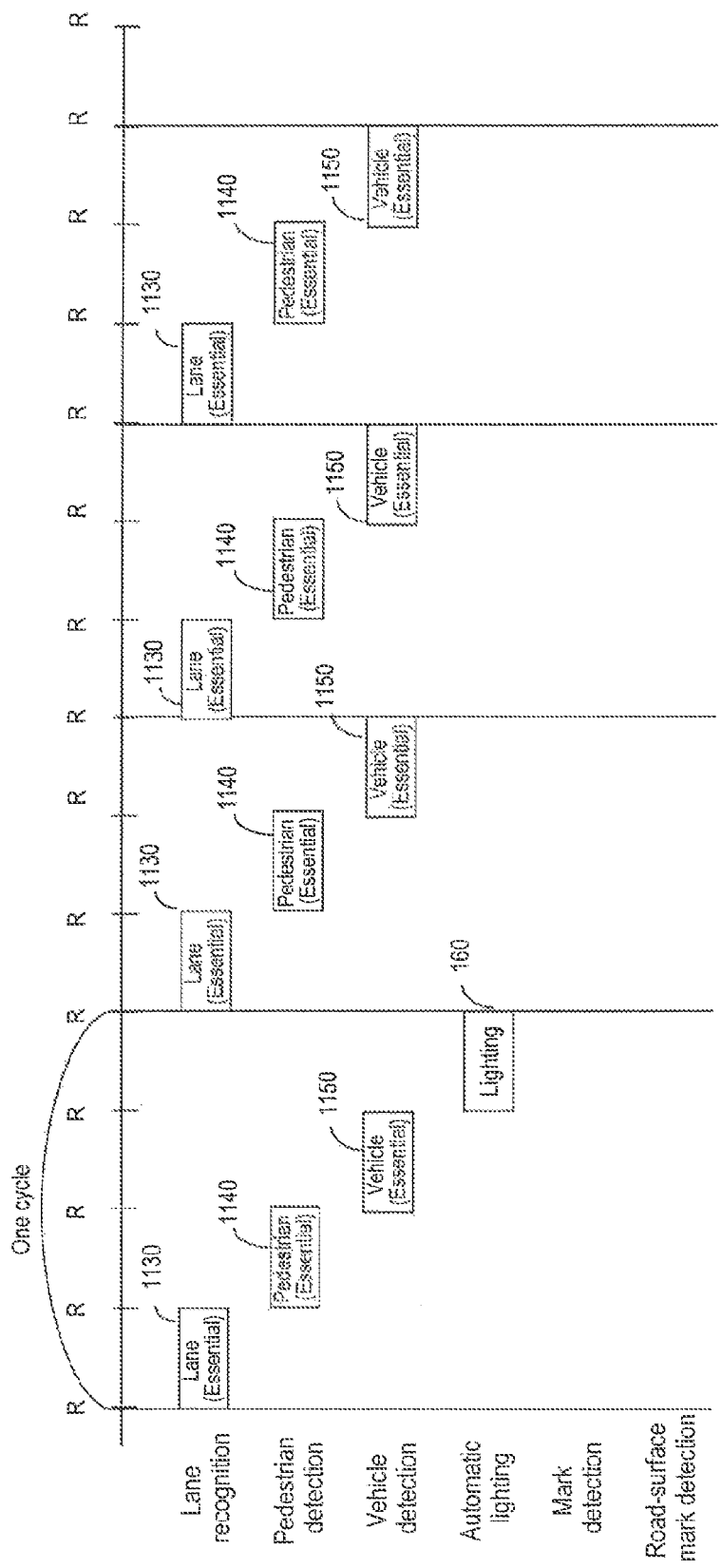
FIG. 13 is an execution timing chart of the multi-applications, for pedestrian collision prevention.
Figure 14:
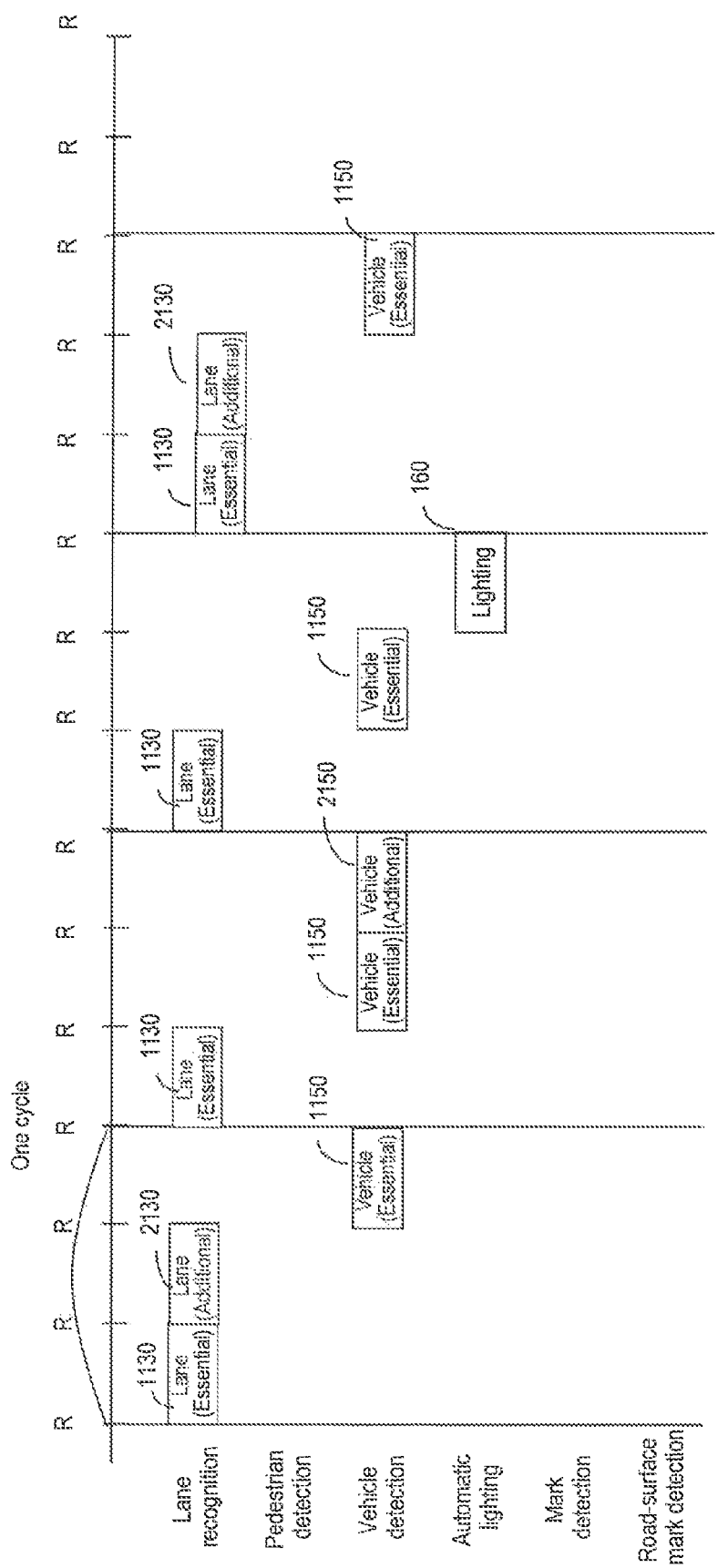
FIG. 14 is an execution timing chart of the multi-applications, which is relevant to avoidance of traffic-lane departure in a high-speed mode.
Figure 15:
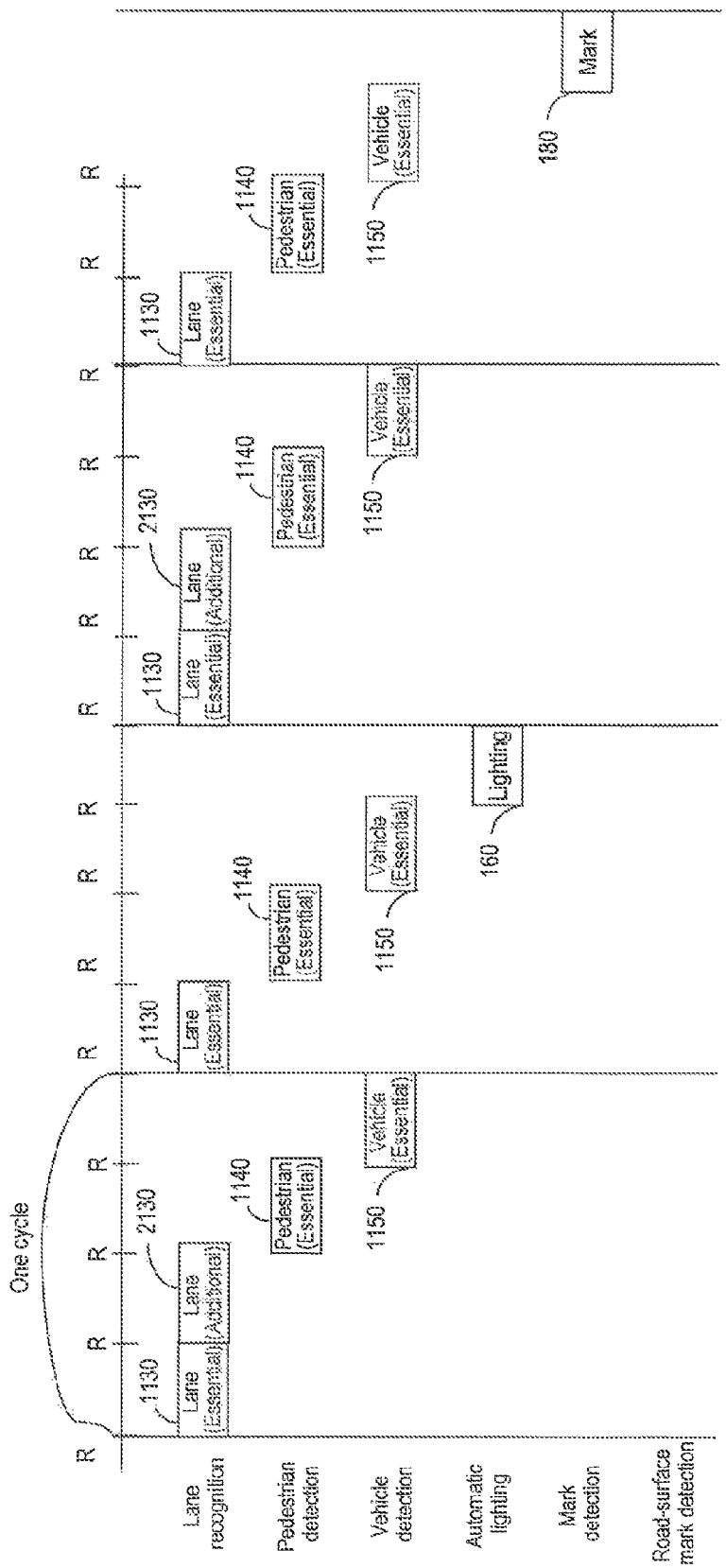
FIG. 15 is an execution timing chart of the multi-applications, which is relevant to maintaining of an inter-vehicle distance from a leading vehicle.

FIG. 13 shows a timing chart at the time of emergency mode in which the cycle corresponding to one cycle is shortened. Shortening of a length of one cycle leads to hastening of the update cycle of the yaw angle and the lateral position, each being calculated by the lane recognition 130 (essential version 1130), and leads to the execution of the control of the traffic-lane departure prevention with high accuracy. In FIG. 11, seven of the execution timing are made one cycle. In FIG. 12, five of the execution timing are made one cycle. In FIG. 13, the length of one cycle is not fixed, and in the case where the emergency processing is required, the length of one cycle can be shortened. In FIG. 13, normally, four of the execution timing are made one cycle. However, as shown in FIG. 13, three of the execution timing are made one cycle, and the execution cycle of the application having the high priority is changed to the short cycle. By this way, it is possible to improve responsiveness.

Next, an explanation will be made as to the time of emergency control of the vehicle collision avoidance in general traveling.

(1) Explanation of Switching Time of Task Table

Figure 19:
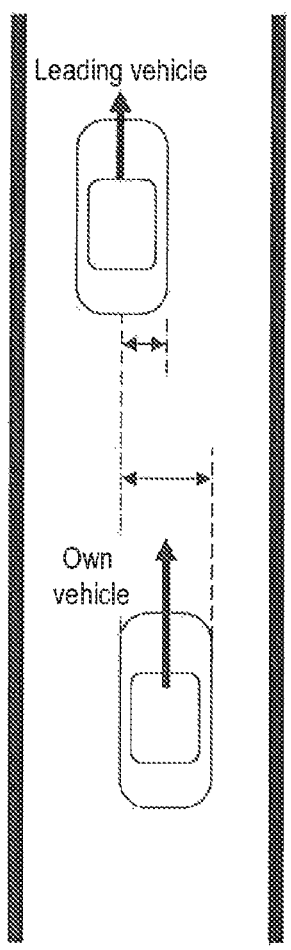
FIG. 19 is a view for showing vehicle-collision avoidance timing.

The vehicle detection 150 or the radar determines whether or not the control or the alarm for the collision avoidance against the leading vehicle is required. As shown in FIG. 19, by means of the external-world recognition device such as the vehicle detection 150 or the radar, it is possible to detect the position of the leading vehicle with respect to the own vehicle in chronological order. Thus, obtained are relative speed Vre and a relative position Lre of the leading vehicle. From the relative speed and the relative position, the time to collision (TTC) is estimated. The time to collision (TTC) is as follows.

Time to collision (TTC)=relative position $Lre$/relative speed $Vre$

The lateral positions (Lat) of the leading vehicle and the own vehicle at the collision-expected time which follows by TTC seconds are calculated.

Lat=(own-vehicle speed $V$×own-vehicle yaw angle cos θ)×time to collision (TTC)

Further, after considering an overlap degree (overlap ratio) of the leading vehicle and the own vehicle, the possibility of collision is estimated. The object is changed from the pedestrian to the vehicle, so that the vehicle speed, the overlap ratio, or the like affects the timing of the task-table change. However, its basic concept is similar to the concept of the pedestrian collision avoidance, so that the details are omitted.

(2) Explanation of Content of Task-Table Change

An explanation of the content of the task-table change will be omitted, because it is identical to the content of the table in the general road of the pedestrian.

Next, an explanation will be made as to the processing at the time of inter-vehicle control in the general traveling, by use of FIG. 19.

(1) Explanation of Time of Activating Control, Namely, Task-Table Change

In the control of the inter-vehicle distance from another vehicle, it is important to maintain the inter-vehicle distance for the collision avoidance. Thus, it is desirable to, at the timing determined that brake control is required for avoiding the collision, change the task table, and thereafter, to execute the vehicle control.

(2) Explanation of Content of Task-Table Change

For example, supposed is a case where in the traveling in a general downtown, the control is executed with the inter-vehicle distance of 30 m to the leading vehicle. In FIG. 19, the vehicle detection 150 (essential version 1150) and the lane recognition 130 (essential version 1130) are the essential functions. It is desirable to execute these applications in the earlier processing cycle. At the timing of activating a control mode, the change processing to the task table shown in FIG. 4 is executed. When another leading vehicle is detected, based on such detection, executed is the switching to the task table shown in FIG. 8. This detection is executed in Step S3 of FIG. 9 or FIG. 10. The switching of the table in FIG. 8 is executed in Step S4 and Step S5. FIG. 8 shows the task table to be used for the control mode in the case of traveling while keeping the inter-vehicle distance to the leading vehicle as the safe distance, for example, 30 m or more in the traveling mode on the general road. The leading vehicle exists 30 m before, so that the effective flag of the vehicle detection 150 (additional version 2150) or the pedestrian detection 140 (additional version 2140) is set to "OFF", and the detection object of the essential version is 40 m. Also regarding the lane recognition 130, although the lane recognition 130 (additional version 2130) is operated; however, it is also highly likely that the road in the distance cannot be seen behind the leading vehicle; so that a detection range is 40 m. In addition, concerning other additional functions, the processing time for one cycle is further shortened by repeating the cycles of the processing after lowering such cycles. By this way, the switching of the task table enables to enhance the safety.

Figure 20:
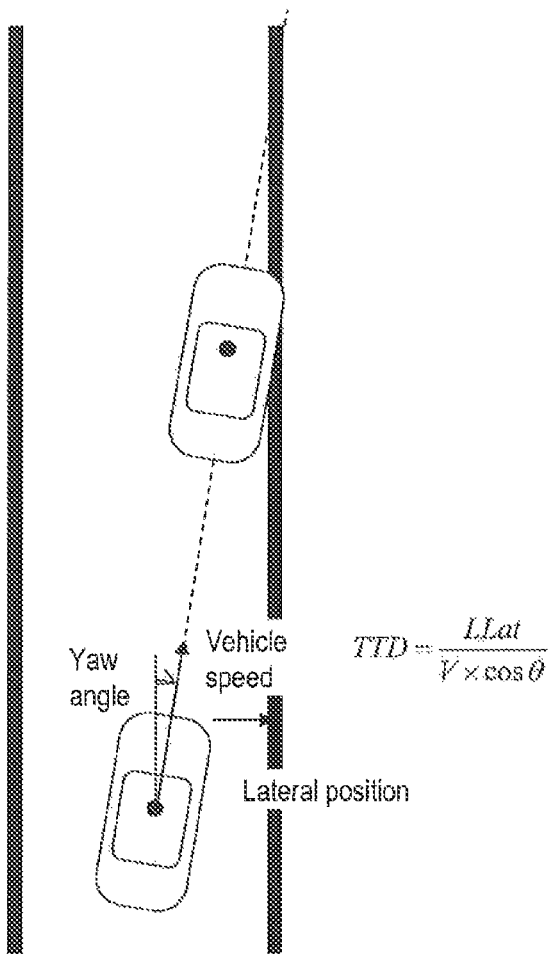
FIG. 20 is a view showing control for traffic-lane departure avoidance from the lane in high-speed traveling.

Next, an explanation will be made as to the control for the traffic-lane departure avoidance from the lane in the high-speed traveling by use of FIG. 20.

(1) Explanation of Switching Time of Task Table

The determination of whether or not the control for the traffic-lane departure avoidance is made depending on the result of the lane recognition 130 (essential version 1130). In the lane recognition 130 (essential version 1130), it is possible to calculate the yaw angle and the lateral position of the own vehicle with respect to the traffic lane. The task-table change for the deceleration control is executed from a point of time which precedes, by predetermined value α, a prediction-calculation time of the control start.

The determination of whether or not the control or the alarm for the traffic-lane departure avoidance is made by the lane recognition 130 (essential version 1130). It is possible to detect the position and a posture of the lane with respect to the own vehicle in chronological order. Thus, the own-vehicle traveling information is also used, and the traffic-lane departure is predicted.

Time to departure from traffic lane (TTD)=traffic-lane lateral position $LLat$/(own-vehicle speed $Vx$ vehicle yaw angle cos θ)

The basic concept is the same as that of the collision avoidance against the pedestrian or the vehicle. In automatic control or the like, in order for the driver not to neglect the avoidance steering, it is desirable to be slower than the avoidance steering which the driver performs in the normal driving, and further for avoiding the traffic-lane departure, it is desirable to be earlier than the timing at which the departure becomes unavoidable. Between the normal avoidance steering of the driver and the timing at which the departure is unavoidable, as well as at the timing earlier, by predetermined value α, than the control-start prediction time, the task table is rewritten. The task table is set earlier than the control start timing, and the cycle of the application is changed, whereby it is possible to execute the vehicle control equivalent to the vehicle control in the case where the recognition processing is executed in the short cycle at all times on the vehicle processing side. In addition, the timing of rewriting the task able is selected slower compared with the avoidance steering which the driver performs in the normal driving, whereby it is attempted that the multi-tasks are not unreasonably changed to the task table for the time of emergency during the normal driving. Accordingly, attention is paid also to the convenience.

(2) Explanation of Content of Task-Table Change

FIG. 7 shows the task table of the multi-applications in the expressway traveling mode. When determined as the expressway traveling in Step S3 or Step S3-1 of FIG. 9 or FIG. 10, in Step S4 or Step S5, or Step S4/S5-2 or Step S4/S5-3 in FIG. 9 or FIG. 10, the table of FIG. 7 is specified by means of a search, and is set as an execution table. In this expressway traveling mode, the essential functions are the lane recognition 130 (essential version 1130) and the vehicle detection 150 (essential version 1150). Assuming that the pedestrian does not exist on the expressway, the processing costs are used for handling a matter that the vehicle speed has been increased. The vehicle speed has been increased, so that it is necessary to lengthen the detection object distance required for the emergency control. Thus, the detection distance which the essential function targets is also lengthened, which is compensated by the processing costs having been spent on the pedestrian. Therefore, in activation timing of the control mode, Step S6 in FIG. 9 or FIG. 10 is executed, and the change processing of the task table is executed as shown in FIG. 7. A modified example of the task table at the time of traffic-lane departure avoidance in the high-speed mode is shown in the task table of FIG. 7. By this way, the application suitable for the traveling environment can be preferentially executed, and the safety can be improved. Also at the time of controlling the traveling on the expressway, two of the lane recognition 130 (essential version 1130) and the vehicle detection 150 (essential version 1150), both being registered in the essential function, are the functions to be operated at all times. While retaining the priority of the function to be used for the control, by lowering the priority or stopping the function regarding the additional function part, the time for one cycle is shortened, whereby the control with high accuracy is enabled. FIG. 13 shows the timing chart at the time of emergency mode which has been shortened by one cycle. By shortening one cycle, the update of the yaw angle and the lateral position, both being calculated by the lane recognition 130 (essential version 1130), is hastened, thereby executing the more advanced control.

Figure 17:
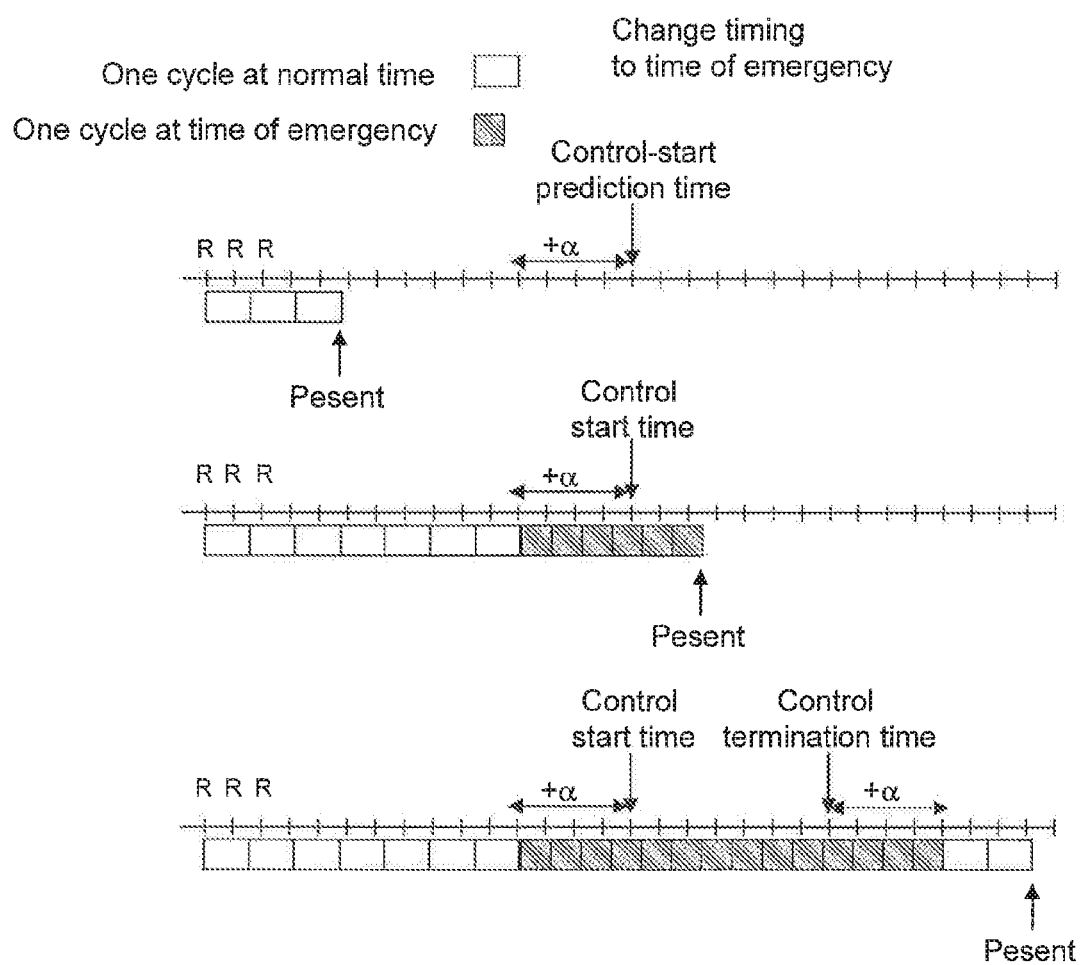
FIG. 17 is an explanatory diagram showing pedestrian-collision avoidance timing.

Other cases also have the way of thinking similar to that of the above-mentioned task-table change timing. Regarding the basic concept, as shown in FIG. 17, the task table is changed at the point of time which precedes, by predetermined value α, the prediction timing at which the control or the alarm is put in motion. Predetermined value α changes depending on a control factor, which has been an activation factor, or on the required function. In addition, although one processing cycle at the normal time becomes long, the additional function is operated. Thus, the information of a large variety of detection results (e.g., the mark, the road-surface mark, or the automatic lighting 160) is obtained. Contrarily, at the time of emergency, one processing cycle is short, and instead of the hastening of the update cycle of the information such as the distance to the pedestrian or the relative position of the vehicle with respect to the lane, the update of the information as to the additional function becomes late or stops.

Figure 22:
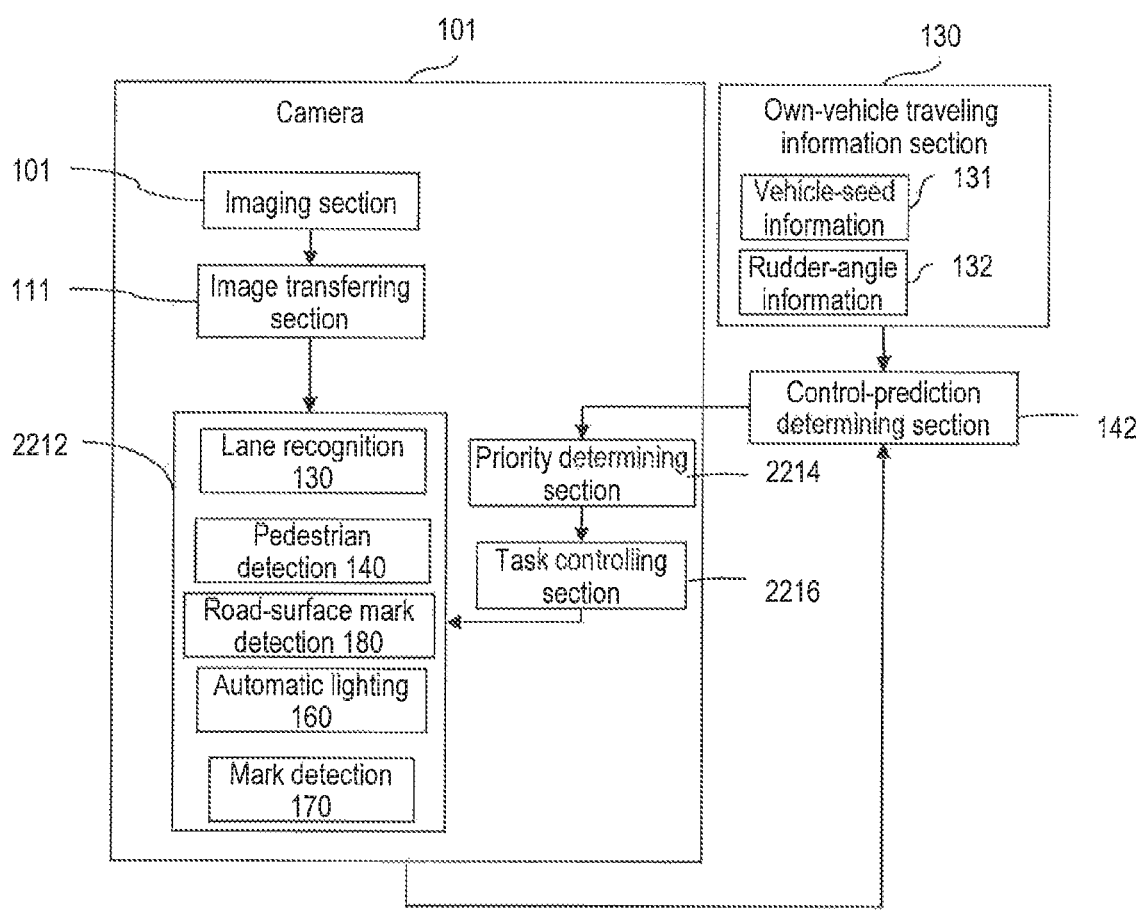
FIG. 22 is a control block diagram showing another embodiment for executing the applications.

FIG. 22 shows another embodiment. The same reference numerals as those of other figures denote the same functions or the same operations. This embodiment is configured such that the processing function of the task table is included in the measurement device 101 of the camera. However, the above-mentioned processing function may be executed by a computer for control in another device. In the traveling-information processing section 130 of the own vehicle; based on vehicle-speed information 131 or steering-angle information 132; in addition, by use of image information or radar information, as necessary; based on the calculated data or the data having been preliminarily stored in accordance with a traveling state, both having been previously explained; the traveling environment, a risk of collision, or a need for paying attention to the obstacle or the pedestrian is selected in a control-prediction determining section 142 with reference to the task table, as previously explained. For example, the task table of FIG. 21 is selected from many task tables which have been preliminarily stored. In Step 2214, as previously explained, based on the task table, the priority of the execution is determined, and starting from the task having the high priority, the execution is made in Step 2216. The application targeted for the execution is the application stored in a storing section 2216. Based on this execution, when a new risk is predicted, or a change in the traveling environment is detected, in the control-prediction determining section 142, the task table corresponding to such prediction or such detection is selected from the task tables which have been preliminarily stored. In accordance with the selected task table, in the above-mentioned Step 2214, the application to be preferentially executed is selected. In Step 2216, the selected application is executed. The task table having been stored may be used, without any change, in the control-prediction determining section 142. However, a part of the stored data may be changed in line with predicted or detected content.

Figure 23:
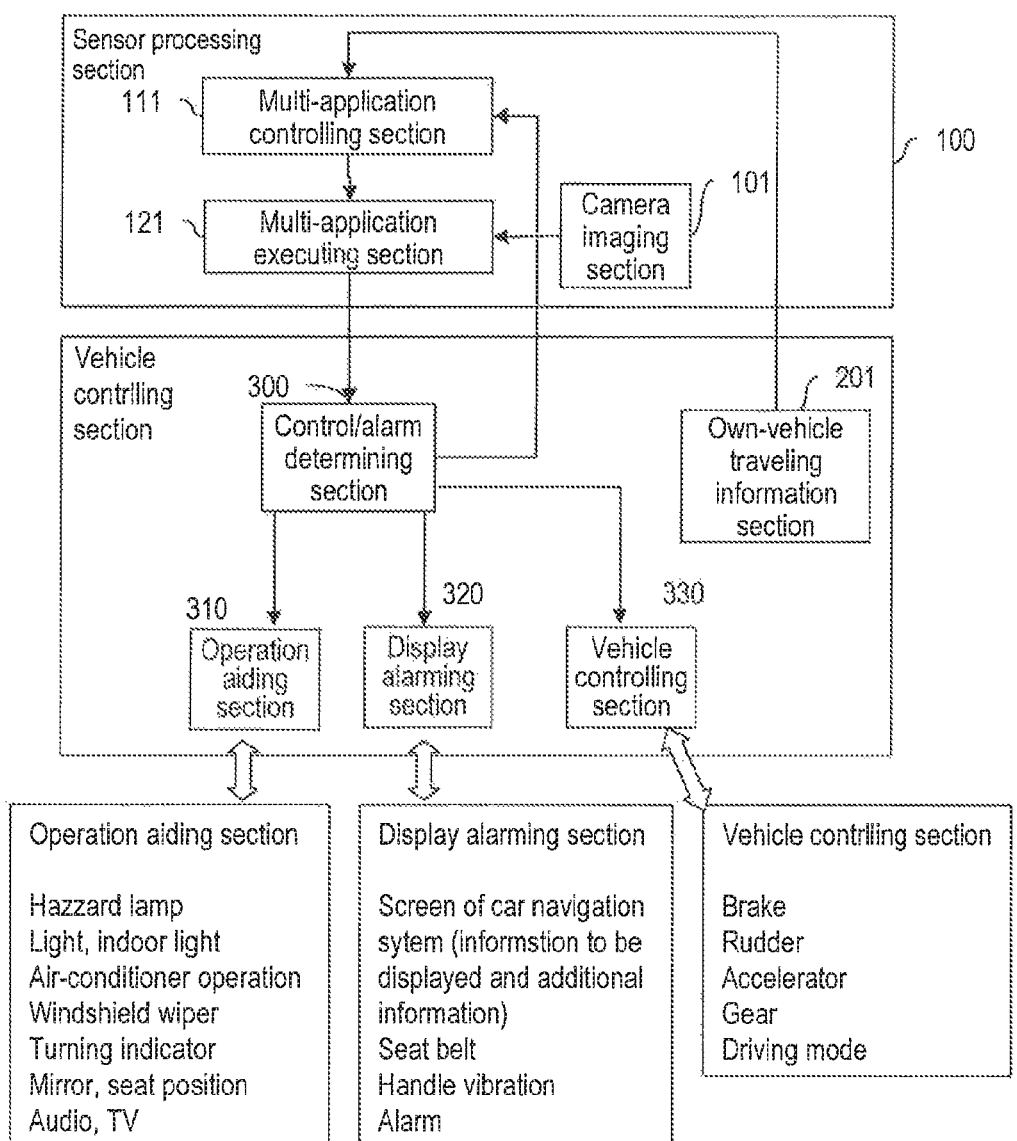
FIG. 23 is a control block diagram showing another embodiment for executing the applications.
Figure 24:
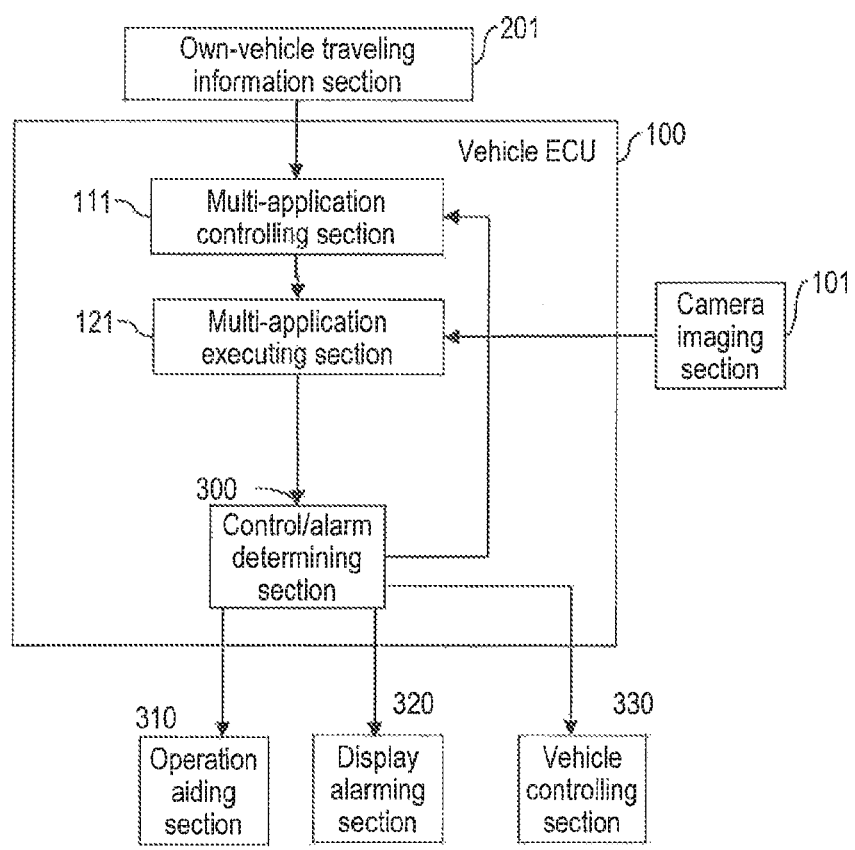
FIG. 24 is a control block diagram showing another embodiment for executing the applications.

FIG. 23 or FIG. 24 is a modified example of FIG. 1. In FIG. 1, the measurement device 101 is integrated with the processing section 100 of the image or the like. However, in an embodiment of FIG. 23, a control/alarm determining section 300 is integrated with other devices; the information which notifies the driver of the risk from the control/alarm determining section 300 or the information which helps the driving is transmitted to an operation aiding section 310, a display alarming section 320, or a vehicle controlling section 330; and via these devices, the driver is informed. Alternatively, such information is used for the control of the above-mentioned devices. In an embodiment of FIG. 24, the processing section 100 executes the processing by use of a calculator of the vehicle control, and its processing content is the same as that of FIG. 23.

Figure 25:
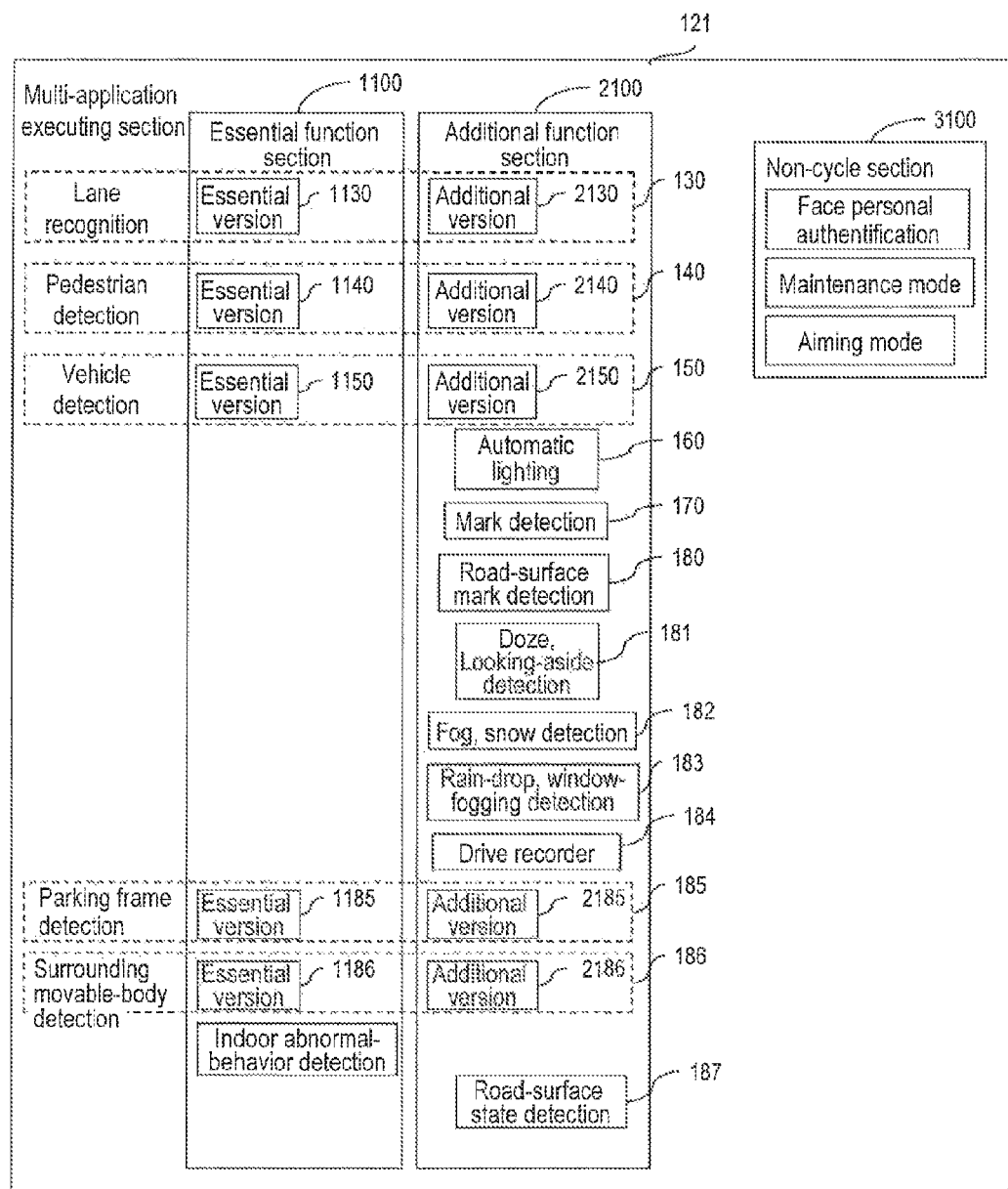
FIG. 25 is a control block diagram showing non-periodic applications.
Figure 26:
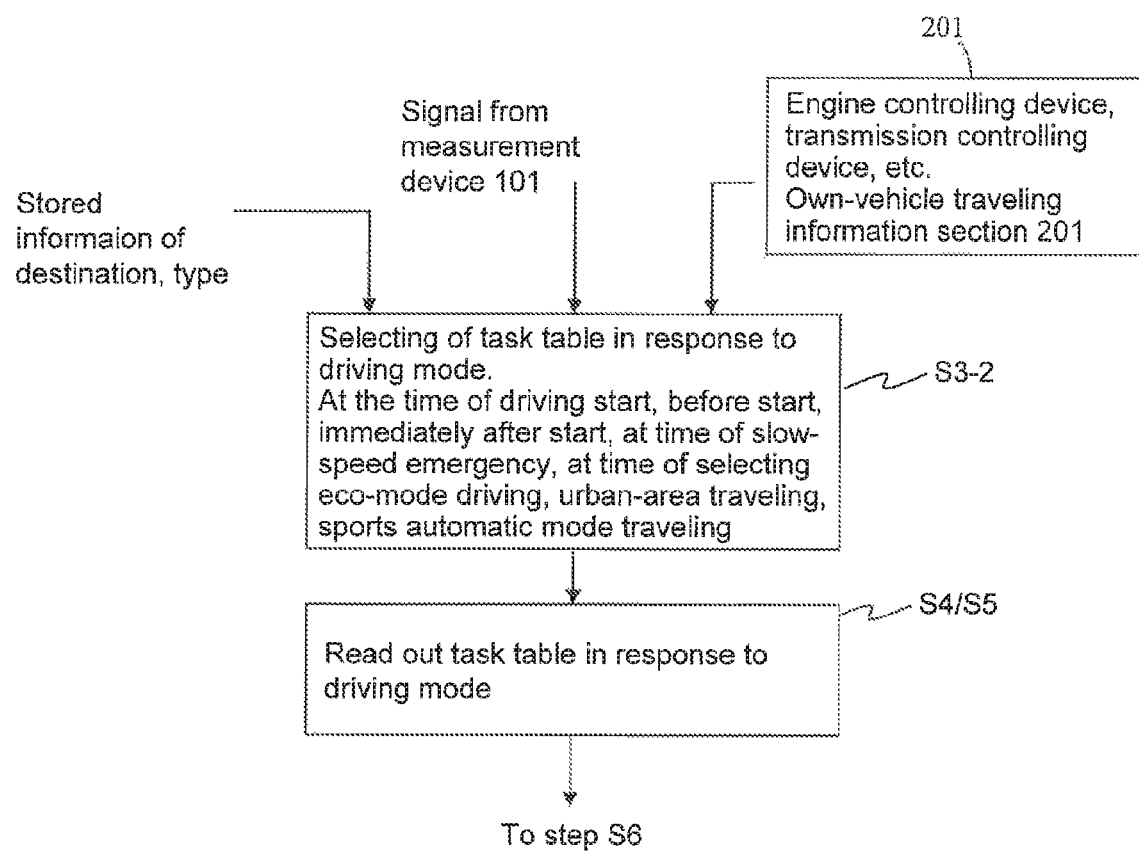
FIG. 26 is an explanatory diagram for showing a change in the task table.

FIG. 25 is an example in which the contents of the applications are further increased. In particular, non-cycle execution applications are retained in a non-cycle section 3100 in the storing section. Among the applications required for the time of starting the vehicle control, there are applications which are not executed during the driving, if executed once. These applications are executed based on a driving mode. The selecting of the task tables in response to the driving mode is shown in FIG. 26. Step S3-2 which determines the task table corresponds to Step S3 or S3-1 of FIG. 9 or FIG. 10. When an engine controlling device, a transmission, or the like is determined to be in a state of driving start on the basis of the information from the own-vehicle traveling information section 201, the task, namely the application in the non-cycle section of FIG. 25 is selected from the stored task tables. In the next Step S4/S5, the specific application is determined, and such application is executed in Step S6. The next Step S4/S5 corresponds to Step S4 or Step S5 of FIG. 9 or FIG. 10, and the function or the operation is the same.

Next, when an inverter device for controlling a rotating electrical machine for vehicle driving starts its operation, Step S3-2 selects the task table before start shown in FIG. 27. The operations of Steps S4/S5 and the operations subsequent to such steps are the same. When the vehicle starts the traveling, Step S3-2 selects the task table shown in FIG. 28. It is to be noted that as described in FIG. 9 or FIG. 10, when danger is detected in Step S3-2, Step S3-2 selects the task table shown in FIG. 29. In this way, the task table is switched in accordance with the status of the vehicle from the driving start of the vehicle through transition to the normal traveling state, thereby enabling the extremely detailed control and improving the safety and the convenience.

In the case where the driver desires the driving in which the priority is placed on economic efficiency, Step S3-2 selects the task table shown in FIG. 30. Preference of the driving in which the priority is placed on the economic efficiency may be confirmed by a switch. However, if a driving pattern of the driver is determined based on the information of the engine controlling device or the transmission, it is possible to determine whether the driver desires the driving in which the priority is placed on the economic efficiency, or the driver prefers sporty driving, and in Step S3-2, the task table suitable for the preference of the driver is selected. It is to be noted that in the case where the sporty driving is preferred, the task table shown in FIG. 32 is selected in Step S3-2. In addition, even in the case where the driving in which the priority is placed on the economic efficiency is desired, when the environmental conditions of rainy weather, snow, and dense fog are detected from camera information, the task table shown in FIG. 31 is selected in Step S3-2. By this way, a detailed response is enabled, and the safety is improved.

FIG. 33 shows a case where the traveling in an urban area has been detected from the camera information and navigation-system information. The task table is switched by means of Step S3-2 in response to driving environments, whereby it is possible to execute the application in accordance with the driving environments, and the safety or the convenience is improved.

The task table shown in FIG. 34, FIG. 35, or FIG. 36 is selected, in accordance with a type or a destination of an application vehicle, in Step S3-2 of FIG. 26. Even in the same type of vehicle, in response to the destination or the type to be used, the application to be executed is different. There are various problems in preparing several kinds of these programs in large numbers. Accordingly, even in the case where the applications each having the same content are mounted, if the configuration is made such that the suitable application is selected based on the information of the destination or the type, it is possible to share the program of the applications.

Figure 38:
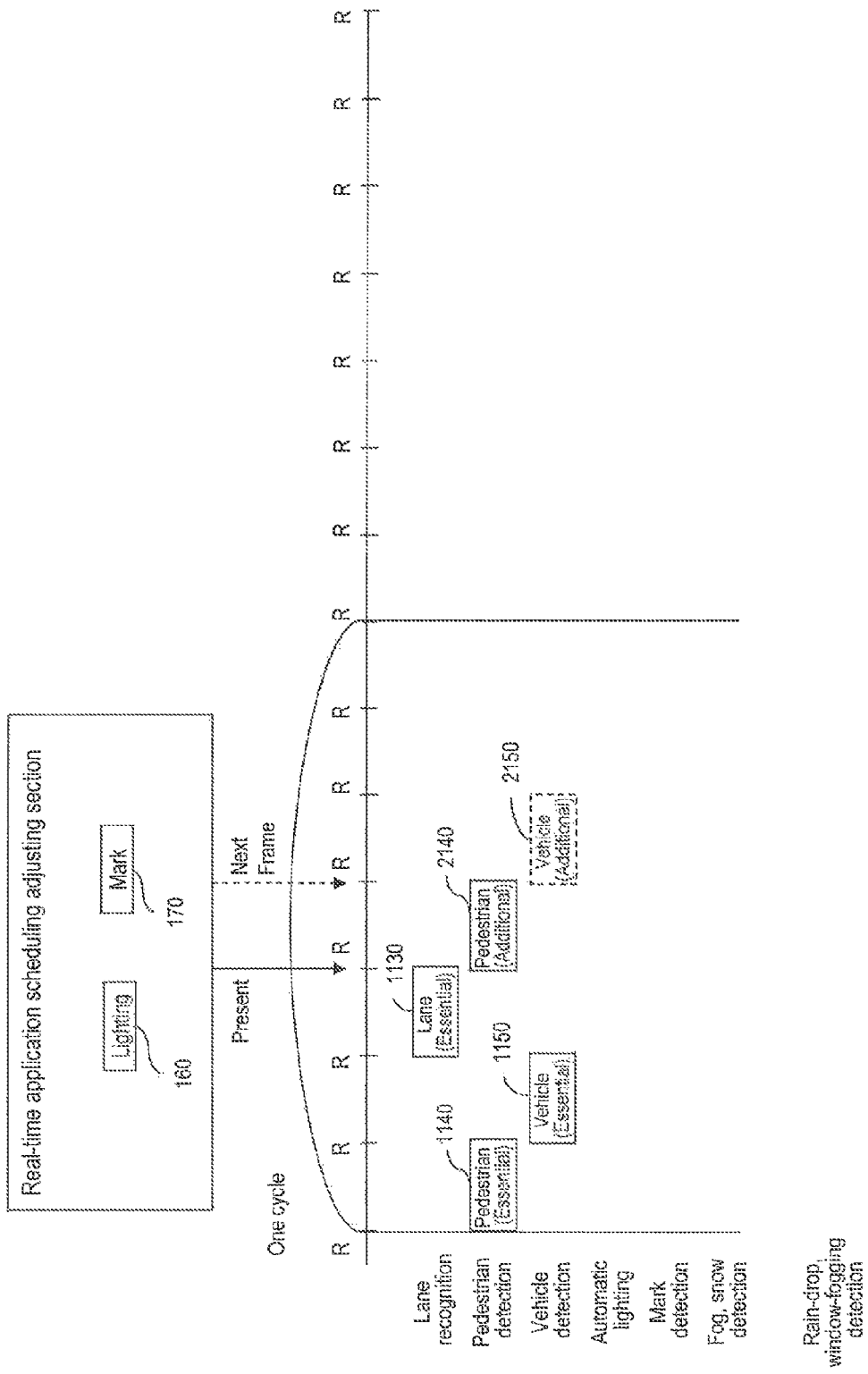
FIG. 38 is an explanatory diagram of the execution timing of the applications, showing another embodiment.
Figure 39:
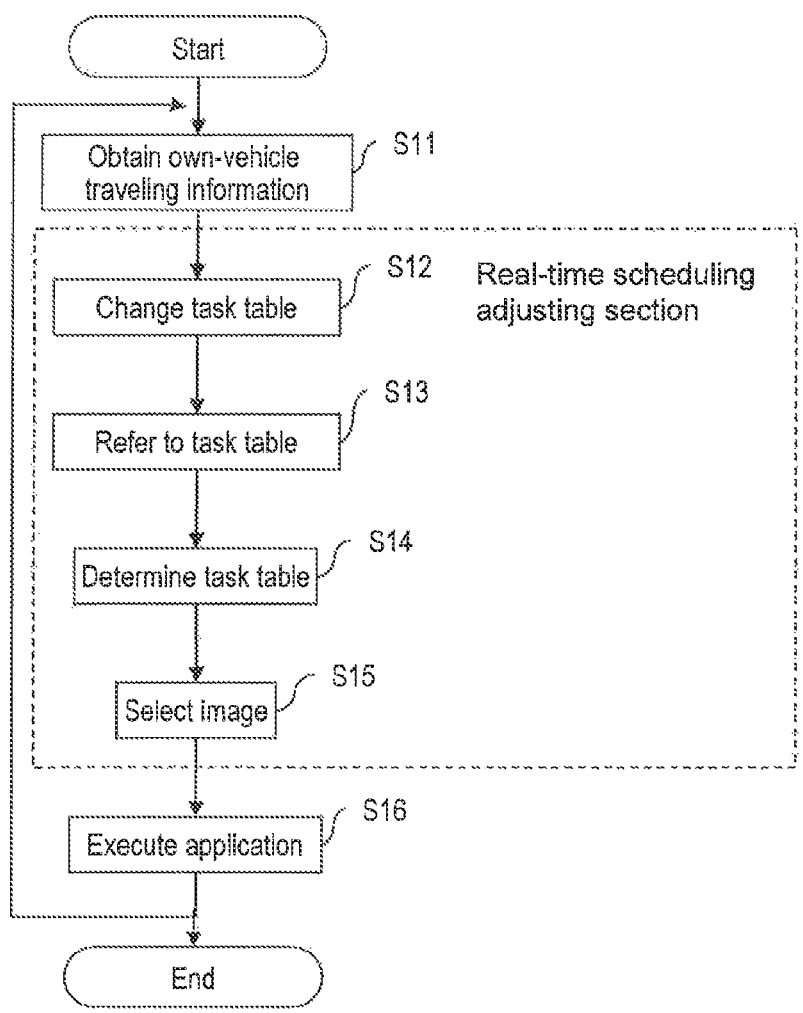
FIG. 39 is an explanatory diagram of an application execution flow, showing another embodiment.

FIG. 38 is an alternative for a setting method or an execution method of the task table, which has been explained in FIG. 11 through FIG. 15. FIG. 38 shows a method in which the determination is made as to which application is executed per execution timing R which configures one cycle, and which application is executed at the remaining execution timing R of the cycle, and the responsiveness can be improved. It is assumed that the execution timing R denoted as "current" of FIG. 38 be now executed. The task table in this status is shown in FIG. 37. Additionally, a control flow at this time is shown in FIG. 39. FIG. 38 shows that the execution of the pedestrian detection (essential version) 1140 and the vehicle detection (essential version) 1150 has already been terminated. The column of the execution status in the task table of FIG. 37 indicates that the execution status in this cycle has been terminated. In the column of a preferential order, the pedestrian detection (essential version) 1140 has the highest priority order, and the vehicle detection (essential version) 1150 has the next-highest priority order. The application having the next-highest priority order is the lane recognition 130 (essential version 1130). This application is now being executed, and in the column of the execution status in the task table of FIG. 37, an indication of being during execution is appeared. Regarding the respective applications in which the effective flag is in an "ON" status, however, the execution is not yet made, the indication of being waiting is set.

When the application is executed in Step S16 of FIG. 39, the execution status is changed to "TERMINATED" in the next Step S12. Further, based on the information from an execution result or the information from the own-vehicle traveling information section 201, in Step S12, a review is made as to with or without the preferential order or other changes in the table. In Step S13, in consideration of the remaining time in one cycle, a check is made as to whether it is possible to execute a waiting application among the applications with the effective flag "ON" and with the processing [1/1]. Next, in Step S14, selected is the application having the high priority among the waiting applications. Accordingly, when the execution of the lane recognition 130 (essential version 1130) is terminated, in Step S14, the pedestrian detection (additional version) 2140 is selected and executed. Subsequently, given that there is no change as to the execution conditions of the task table in Step S2, the vehicle detection (additional version) 2150 is executed in accordance with the priority orders. In this way, the setting of the task table or the selecting of the task is executed per execution timing R.

In FIG. 37, regarding the automatic lighting application 160 or the mark detection application 170, the column of the processing is ⅕ or ⅓, and a counter which controls the execution cycle performs number count per cycle. When a value of the counter reaches a cycle number in the column of the processing, in this case, 5 cycle number, the automatic lighting application 160 becomes in a waiting status. Similarly, every time the value of the counter which controls the execution cycle reaches 3, the mark detection application 170 has a default value, and at that time, becomes in the waiting status. It is to be noted that, needless to say, when the effective flag is changed to "OFF," the status does not become in the waiting status, and thus, the execution is not made if the effective flag is in an "OFF" status. It should be noted that in the case where the application is executed in FIG. 39, the resolution of the information is determined in accordance with the column of the resolution in Step S5. This is, as mentioned above, intended to suppress the load for the processing, due to the execution of the processing with the unnecessary resolution, to the necessary value.

Figure 40:
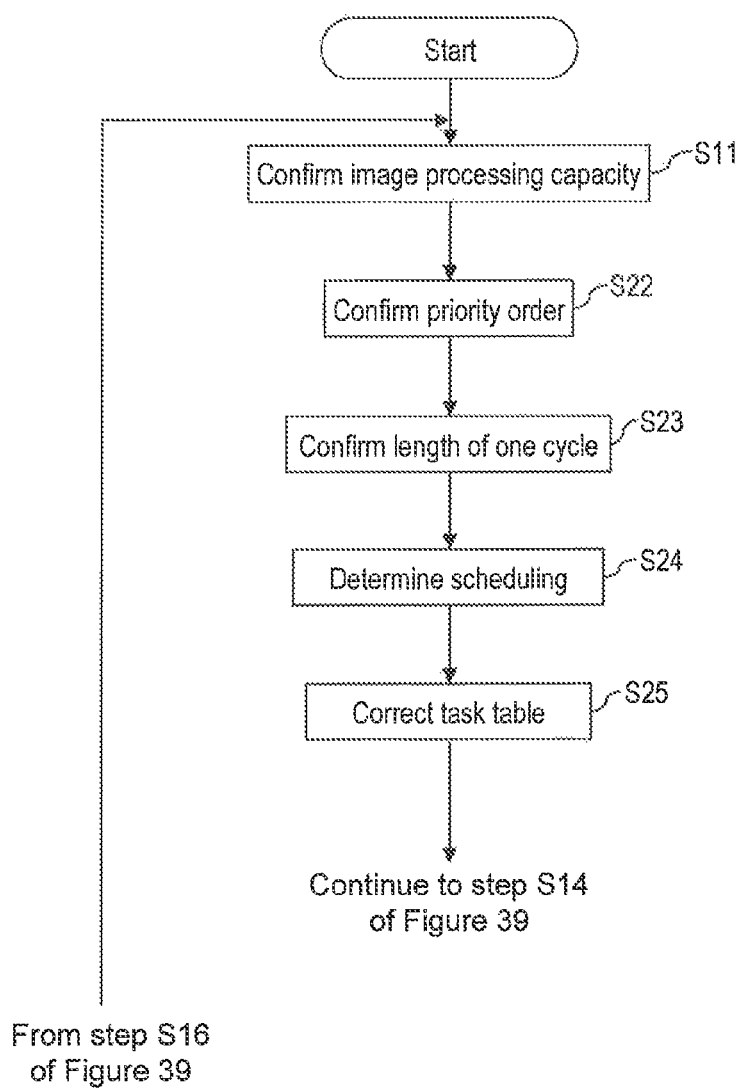
FIG. 40 is an explanatory diagram of the application execution flow, showing still another embodiment.

FIG. 40 includes the function which considers the information of the type or the destination, in addition to the processing of FIG. 39. It is to be noted that, needless to say, although Step S11 includes the function of S11 in FIG. 39, its explanation will be omitted. In Step S11 of FIG. 40, in addition to the processing of S11 in FIG. 39, the destination, or a difference in CPU or a hardware configuration is determined based on type information; a set of task tables is selected; and the content of the task table is changed in accordance with the destination or the type information. Next, in Step S12, the priority order of the application is changed based on whether or not the vehicle is for urban-area traveling. In Step S13, changed, namely, set is the length of one cycle in response to assumed vehicle speed or the application having the high priority order. For example, in the case of the vehicle for the urban area, the length of one cycle is lengthened, whereas in the case of a sport-type vehicle, the length of one cycle is shortened.

Even if hardware of the vehicle is the same, in the case of changing the destination, the priority order or the number of execution timing which configures the cycle is different. For example, in North America, many accident factors include the traffic-lane departures, so that the setting is made in such a manner that the priority of the lane is raised. Meanwhile, in Japan, there are many accidents attributed to a pedestrian vehicle, so that the priority of the pedestrian vehicle is raised. In addition, in order to place the priority on correspondence to high speed, the setting is made in such a manner that the processing time for one cycle in Europe and the United States is shorter than that in Japan.

As explained above, in the above-described embodiment, it is possible to control with or without the execution of the respective applications, the priority of the execution, and the execution cycle by use of the task table. This makes it possible to make the detailed changes based on the state of the vehicle or the traveling environment, and attempt to improve the safety.

In addition, in the above-described embodiment, it is possible to create the program per application, and to intricately combine the programs by use of the task table. Thus, quality of the control is improved.

Moreover, in the creation of the program, even if the execution conditions of other programs are not so much considered, the system can be configured, and productivity of the application is significantly improved.

In the event of occurrence of an abnormality, or in the case of confirming the operation, the effective flag of the task table is changed per application, whereby it is possible to easily operate the execution and the execution stop, and confirmation operation is made extremely easy.

The invention claimed is:

1. An information processing device, associated with vehicle traveling, the information processing device comprising:
   an information obtaining section configured to obtain information associated with a traveling state of a vehicle;
   a plurality of task tables, each task table: i) corresponding to a given type of traveling environment, and ii) storing applications configured to recognize features of the given type of traveling environment, each application being: a) assigned a priority based on a likelihood of encountering a given feature of the given type of traveling environment, and b) divided into two versions of the same application, a first version and a second version;
   a controlling section configured to determine a likelihood of encountering an emergency event, based on the information obtained by the information obtaining section;
   an executing section comprising a first executing section configured to execute the first version, which is associated with improving safety of traveling, and a second executing section configured to execute the second version, which is associated with an improvement in traveling feeling, wherein
      the controlling section is configured to select one task table to be referred to from among the plurality of task tables, based on the content of the emergency event, and
      in a case that the emergency event is detected, the second version of a given application is turned OFF, but the given application is still executable via the first version.

2. The information processing device according to claim 1, wherein
   the information obtaining section obtains an image associated with a traveling environment, and
   the controlling section is configured to determine that encountering the emergency event is likely, based on the information and the image obtained by the information obtaining section.

3. The information processing device according to claim 2, wherein
   the controlling section is configured to predict a time required for emergency control, based on the information and the image obtained by the information obtaining section, and
   in a case where the predicted time is less than a predetermined value, the controlling section is configured to determine that encountering the emergency event is likely.

4. The information processing device according to claim 1, wherein
   the first version comprises an application for detecting an obstacle which exists nearer than a first distance, and an application for detecting the obstacle which exists at a distance that is farther than the first distance.

5. The information processing device according to claim 4, wherein the obstacle detected by the first version includes a pedestrian.

6. The information processing device according to claim 4, wherein
   the information obtaining section is configured to obtain an image associated with a traveling environment, and
   in order to change the processing cycle of executing the first version, the controlling section is configured to change conditions of a distance, which is a detection object detected from the image.

7. The information processing device according to claim 2, wherein
   the controlling section is configured to change a resolution of the detection object detected from the image, based on the content of the emergency event.

8. The information processing device according to claim 1, wherein
   in order to change an execution cycle of the first executing section, the controlling section determines that part of or an overall processing function of the second executing section is stopped.

9. The information processing device according to claim 1, wherein
the first version comprises:
one application which recognizes a traveling lane in a case where a curvature of the traveling lane is equal to or less than a predetermined curvature, and
another application which recognizes a traveling lane in a case where a curvature of the traveling lane is larger than a predetermined curvature.

10. The information processing device according to claim 1, wherein
the first version is configured to recognize a traveling lane or an obstacle, and
the second version is configured to control an irradiation direction of a light.

11. The information processing device according to claim 1, wherein
the first version is configured to recognize a traveling lane or an obstacle, and
the second version is configured to detect a road mark.

* * * * *